US008474021B2

(12) United States Patent
Hearn et al.

(10) Patent No.: US 8,474,021 B2
(45) Date of Patent: Jun. 25, 2013

(54) SECURITY SYSTEM AND METHOD FOR COMPUTERS

(75) Inventors: Michael Alfred Hearn, Duncraig (AU); Richard Kabzinski, Ellenbrook (AU)

(73) Assignee: Secure Systems Limited (AU)

( * ) Notice: Subject to any disclaimer, the term of this patent is extended or adjusted under 35 U.S.C. 154(b) by 884 days.

(21) Appl. No.: 10/482,565

(22) PCT Filed: Jun. 28, 2002

(86) PCT No.: PCT/AU02/00847
§ 371 (c)(1),
(2), (4) Date: Dec. 10, 2004

(87) PCT Pub. No.: WO03/003242
PCT Pub. Date: Jan. 9, 2003

(65) Prior Publication Data
US 2005/0091522 A1 Apr. 28, 2005

(30) Foreign Application Priority Data

Jun. 29, 2001 (AU) .............................. 6026
Jun. 29, 2001 (AU) .............................. 6027
Jun. 29, 2001 (AU) .............................. 6028

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ................................................ 726/6; 171/82

(58) Field of Classification Search
USPC .................... 705/59; 713/153, 161, 159, 166, 713/2; 726/20, 17, 11, 3, 6; 707/1; 711/103; 380/277
See application file for complete search history.

(56) References Cited

U.S. PATENT DOCUMENTS 4,672,572 A * 6/1987 Alsberg .......................... 726/11
4,882,752 A * 11/1989 Lindman et al. ............... 713/166

(Continued)

FOREIGN PATENT DOCUMENTS

| AU | 704130 B2 | 4/1999 |
| AU | 736077 B2 | 7/2001 |

(Continued)

OTHER PUBLICATIONS

"European Search Report for Application No. EP 02 74 0127, Date mailed Aug. 19, 2005", 8 Pages.

(Continued)

*Primary Examiner* — Mohammad W Reza
*Assistant Examiner* — Monjour Rahim
(74) *Attorney, Agent, or Firm* — Schwegman Lundberg & Woessner, P.A.

(57) ABSTRACT

A computer security device comprising a processor that is independent of the host CPU for controlling access between the host CPU and the storage device. A program memory that is independent of the computer memory and the storage device unalterably stores and provides computer programs for operating the processor in a manner so as to control access to the storage device. The security device is connected only in line with the data access channel between the host CPU and the storage device, and off the main data and control bus of the host CPU. All data access by the host CPU to the data storage device is blocked before initialization of the security device and is intercepted immediately after the initialization under the control of the processor. The processor effects independent control of the host CPU and configuration of the computer to prevent unauthorized access to the storage device during the interception phase. All users of the computer are authenticated with a prescribed profile of access to the storage device and data access to the storage device remains blocked until a user of the computer is correctly authenticated.

17 Claims, 12 Drawing Sheets

U.S. PATENT DOCUMENTS

| | | | |
|---|---|---|---|
| 4,975,950 A | | 12/1990 | Lentz |
| 4,984,272 A * | | 1/1991 | McIlroy et al. .................. 726/17 |
| 4,995,112 A * | | 2/1991 | Aoyama ........................... 726/6 |
| 5,022,077 A | | 6/1991 | Bealkowski et al. |
| 5,048,085 A * | | 9/1991 | Abraham et al. ............. 713/159 |
| 5,138,711 A * | | 8/1992 | Miyoshi et al. .................... 707/1 |
| 5,144,659 A | | 9/1992 | Jones |
| 5,144,660 A | | 9/1992 | Rose |
| 5,263,147 A * | | 11/1993 | Francisco et al. .............. 711/164 |
| 5,265,163 A | | 11/1993 | Golding et al. |
| 5,289,540 A | | 2/1994 | Jones |
| 5,379,342 A | | 1/1995 | Arnold et al. |
| 5,402,492 A * | | 3/1995 | Goodman et al. ............... 726/20 |
| 5,475,839 A | | 12/1995 | Watson et al. |
| 5,483,649 A | | 1/1996 | Kuznetsov et al. |
| 5,559,993 A | | 9/1996 | Elliott et al. |
| 5,586,301 A | | 12/1996 | Fisherman et al. |
| 5,598,531 A | | 1/1997 | Hill |
| 5,657,445 A | | 8/1997 | Pearce |
| 5,657,470 A | | 8/1997 | Fisherman et al. |
| 5,657,473 A | | 8/1997 | Killean et al. |
| 5,878,210 A | | 3/1999 | Kong |
| 5,884,026 A | | 3/1999 | Kong |
| 5,911,778 A | | 6/1999 | Garnett |
| 5,920,893 A * | | 7/1999 | Nakayama et al. ........... 711/147 |
| 5,951,687 A * | | 9/1999 | Chan et al. ......................... 713/2 |
| 5,953,502 A | | 9/1999 | Helbig, Sr. |
| 5,983,352 A | | 11/1999 | Kong |
| 6,038,667 A | | 3/2000 | Helbig, Sr. |
| 6,052,781 A | | 4/2000 | Weber |
| 6,069,953 A | | 5/2000 | Kong |
| 6,088,802 A * | | 7/2000 | Bialick et al. ...................... 726/3 |
| 6,115,819 A | | 9/2000 | Anderson |
| 6,212,635 B1 | | 4/2001 | Reardon |
| 6,243,813 B1 | | 6/2001 | Kong |
| 6,272,533 B1 | | 8/2001 | Browne |
| 6,311,273 B1 | | 10/2001 | Helbig et al. |
| 6,324,627 B1 | | 11/2001 | Kricheff et al. |
| 6,330,648 B1 | | 12/2001 | Wambach et al. |
| 7,054,990 B1 * | | 5/2006 | Tamura et al. ................. 711/103 |
| 7,353,209 B1 * | | 4/2008 | Peinado et al. .................. 705/59 |
| 2002/0023210 A1 * | | 2/2002 | Tuomenoksa et al. ........ 713/161 |
| 2002/0099937 A1 * | | 7/2002 | Tuomenoksa ................. 713/153 |

FOREIGN PATENT DOCUMENTS

| | | |
|---|---|---|
| CN | 1124377 A | 6/1996 |
| CN | 1223406 A | 7/1999 |
| DE | 4034444 A1 | 5/1992 |
| EP | 0449242 A2 | 10/1991 |
| EP | 0602867 A1 | 6/1994 |
| EP | 0432333 B1 | 2/1996 |
| EP | 1001331 A2 | 5/2000 |
| GB | 2181281 A | 4/1987 |
| GB | 2248324 A | 4/1992 |
| GB | 2279163 A | 12/1994 |
| GB | 2303721 A | 2/1997 |
| GB | 2304213 A | 3/1997 |
| JP | 3-141446 A | 6/1991 |
| JP | 9-319644 A | 12/1997 |
| WO | WO-90/13084 | 11/1990 |
| WO | WO-9302419 A1 | 2/1993 |
| WO | WO-9306542 A1 | 4/1993 |
| WO | WO-9309495 A1 | 5/1993 |
| WO | WO-9309498 A1 | 5/1993 |
| WO | WO-9317388 A1 | 9/1993 |
| WO | WO-9516238 A1 | 6/1995 |
| WO | WO-9524696 A2 | 9/1995 |
| WO | WO-9704376 A1 | 2/1997 |
| WO | WO-9815086 A1 | 4/1998 |
| WO | WO-01/13214 A1 | 2/2001 |

OTHER PUBLICATIONS

Corn, Ve Ibanez, et al., "User Logon Profile, User Interface", *IBM Technical Disclosure Bulletin, IBM Corp.*, vol. 34, No. 4A9 (Sep. 1, 1991), 63-77.

"International Application Serial No. PCT/AU02/00847, International Preliminary Examination Report mailed Aug. 20, 2002", 3 pgs.

"International Application Serial No. PCT/AU02/00847, International Search Report mailed Aug. 20, 2002", 5 pgs.

"European Application Serial No. 02740127.2, Office Action mailed Nov. 7, 2008", 3 pgs.

"European Application Serial No. 02740127.2, Office Action mailed Nov. 11, 2009", 3 pgs.

"European Application Serial No. 02740127.2 Office Action mailed Nov. 15, 2007", 3 pgs.

"European Application Serial No. 02740127.2, Response Filed Mar. 31, 2009 to Office Action mailed Nov. 7, 2008", 8 pgs.

"European Application Serial No. 02740127.2 Response filed Apr. 30, 2010 to Office Action mailed Nov. 11, 2009", 6 pgs.

"European Application Serial No. 02740127.2, Response filed May. 16, 2008 to Office Action mailed Nov. 15, 2007", 14 pgs.

"European Application Serial No. 02740127.2, Response fled Oct. 4, 2011 to Summons mailed Apr. 19, 2011", 19 pgs.

"European Application Serial No. 02740127.2, Summons mailed Apr. 19, 2011", 2 pgs.

\* cited by examiner

SECURITY SYSTEM AND METHOD FOR COMPUTERS

RELATED APPLICATIONS

This application is a U.S. National Stage Filing under 35 U.S.C. 371 from International Application No. PCT/AU02/00847 filed Jun. 28, 2002 and published in English as WO 03/003242A1 on Jan. 9, 2003, which claimed priority from Australian Application Nos. PR 6026, PR 6027 and PR 6028, all filed on Jun. 29, 2001; which applications and publication are incorporated herein by reference.

FIELD OF THE INVENTION

This invention relates to a security system for securing data and information stores in computer systems and a method of securing the same.

In the context of this specification, a computer system is defined to include a computer having a central processing unit (CPU) and a storage device, which may be a hard disk, CD R/W or other read/writeable data storage media or any combination of the same, and a network incorporating one or more such computers, as in a client server system.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND

In these days of widespread computer usage, data stored on a computer system is becoming increasingly accessible to a variety of users. This may occur directly in real time via local and/or remote use of a computer system by different users or indirectly via the loading and running of computer programs at predetermined times automatically or manually by a user of the computer system. With the advent of computer networks allowing remote access to computer systems via local area networks and wide area networks such as the Internet, and the ready transfer of computer programs and data between computer systems, either manually via floppy disks and CD ROMs or automatically via computer networks, the security and integrity of data and information stored on the read/write stores of computers is becoming increasingly of paramount importance.

It is now common place for computer systems to incorporate "anti-virus" software in order to protect the data and information stored on the storage device thereof from hostile computer programs, and user authentication procedures allowing predetermined levels of access to data and information stored on the storage device of the computer system, dependent upon the status of the user.

A problem with most types of anti-virus software and user authentication protocols used today is the very fact that they are embodied in software, which is required to be executed under the control of the operating system of the computer. Hence, a pre-requisite for such anti-virus or user authentication software to function correctly is that the computer system must be able to power-on, boot-up and invoke the operating system "cleanly", without any virus or security defeating processes affecting the computer during this time.

In the case of anti-virus software, most of this software depends upon having some knowledge of the virus or type of virus that it is attempting to secure the system from. Hence, the anti-virus software needs to be constantly updated and entered onto the computer system before a particular virus finds its way to the computer system.

As certain viruses can be extremely hostile and destructive to computer systems, the lag time between the first occurrence of a virus and the production of software to combat the virus still creates a window within which oftentimes irreparable damage can occur to certain computer systems infected with such a virus. Indeed, the production of viruses and anti-virus software does have a tendency to be self-perpetuating. Thus whilst better solutions may have been proposed in the past to combat viruses and ensuring the security of data and information, the state of the art has remained around adopting a software approach to deal with the problem.

Notwithstanding this, various hardware-based solutions, which are intrinsically more reliable and resilient in preventing virus or unauthorized access to data stored on a computer system, have been proposed in the past. However, these have been awkward to apply, restricted in their adaptablility to different and changing formatting standards or have required user interaction of a technical nature well beyond the mere loading of executable programs, in order to make them effective or even operational.

SUMMARY OF THE INVENTION

It is an object of the present invention to provide more robust protection for data and information stored on a computer system from unauthorized access and/or misuse.

In accordance with one aspect of the present invention, there is provided a security device for a computer having a host central processing unit (CPU), memory used by the host CPU to load programs in order to operate the computer and a storage device for storing data to be handled by the computer, the security device comprising:

processing means independent of the host CPU for controlling access between the host CPU and the storage device; and program memory means independent of the memory of the computer and the storage device to unalterably store and provide computer programs for operating the processing means in a prescribed manner to control said access;

wherein the security device is to be connected only in line with the data access channel between the host CPU and the storage device, and off the main data and control bus of the host CPU.

Preferably, the security device includes memory store means independent of the memory means and the storage device of the computer to store critical data and control elements associated with the basic operation of the computer and access to the storage device.

Preferably, said critical data and control elements are supplied to and used by the host CPU for verification of the storage device and operating the computer independently of the storage device during the start up sequence of the computer.

Preferably, the security device comprises authentication means to authenticate a user of the computer having a prescribed profile of access to the storage device.

Preferably, the authenitication means includes a login verifying means to enable a user of the computer to enter a login identification and password and have that login identification and password verified to authenticate said user being an authorized user of the computer having a prescribed profile of access to the storage device before allowing the start up sequence of the computer to proceed further.

Preferably, said login identification and passwords of authorized users and the prescribed profile of access thereof form part of said critical data and control elements and said login verifying means accesses said critical data and control elements to effect authentication of a user.

Preferably, the prescribed profile of access comprises a prescribed allocation of predetermined levels of access permitted for an authorized user of the computer to prescribed partitions or zones of the storage device.

Preferably, the security device includes intercepting means to block all data access by the host CPU to the data storage device before initialization of the security device and intercept all said data access immediately after said initialization under the control of said processing means.

Preferably, said critical data and control elements include identification data in respect of the storage device for enabling the computer to complete its peripheral check during said start up sequence.

Preferably, said critical data and control elements include a custom boot sector that includes invoking said authentication means for assuming operation of the computer during said start up sequence.

Preferably, the authentication means includes an authentication application program stored in the program memory means, the memory store means or the storage device.

Preferably, the authentication application program includes user editing means to enable an authorized user having a particular prescribed level of access to create and edit authorized users for accessing the storage device.

Preferably, the authentication application program includes access profile editing means to enable said authorized user having a particular prescribed level of access to allocate and edit particular predetermined levels of access to said prescribed partitions or zones for all authorized users having access to the storage device.

In accordance with another aspect of the present invention, there is provided a method for securing and protecting a storage device for storing data to be handled by a computer from unauthorized access, the computer having a host central processing unit (CPU) and memory used by the host CPU to load programs in order to operate the computer and storage device, the method comprising:

controlling access between the host CPU and the storage device independently of the host CPU; and
  unalterably storing computer programs for effecting said controlling access in a location separate from the memory and not addressable by the host CPU.

Preferably, the method includes storing critical data and control elements associated with the basic operation of the computer and access to the storage device in a location separate from the memory and the storage device and not addressable by the host CPU.

Preferably, the method includes independently supplying the host CPU with said critical data and control elements for verification of the storage device and operating the computer independently of the storage device during the start up sequence of the computer.

Preferably, the method includes authenticating a user of the computer having a prescribed profile of access to the storage device.

Preferably, said authenticating includes enabling a user of the computer to enter a login identification and password and verifying the same to establish whether the user is an authorized user of the computer having a prescribed profile of access to the storage device before allowing the start up sequence of the computer to proceed further.

Preferably, said login identification and passwords of authorized users and the prescribed profile of access thereof form part of said critical data and control elements and the verifying includes comparing the entered login identification and password with the login identification and passwords within said critical data and control elements and authenticating a user if there is match.

Preferably, the prescribed profile of access comprises a prescribed allocation of predetermined levels of access permitted for an authorized user to prescribed partitions or zones of the storage device.

Preferably, the method includes blocking all data access by the host CPU to the data storage device during initialization of the computer and intercepting all said data access during the start up sequence after said initialization.

Preferably, said critical data and control elements include identification data in respect of the storage device for enabling the computer to complete its peripheral check during said start up sequence.

Preferably, said critical data and control elements include a custom boot sector for the computer that includes invoking the authentication step; and the method includes assuming operation of the computer during said start up sequence with the custom boot sector and authenticating the user of the computer at such time.

Preferably, said authenticating includes enabling a particular prescribed level of authorized user to create and edit login identifications and passwords within the critical data and control elements for specifying authorized users having access to the storage device.

Preferably, said authenticating includes enabling said particular prescribed level of authorized user to allocate and edit particular predetermined levels of access to said prescribed partitions or zones for all authorized users having access to the storage device within the critical data and storage elements.

In accordance with a further aspect of the present invention, there is provided a security device for a computer having a host central processing unit (CPU), memory used by the host CPU to load programs in order to operate the computer and a storage device for storing data to be handled by the computer, the security device comprising:

processing means independent of the host CPU for controlling access between the host CPU and the storage device; and;
  intercepting means to block all data access by the host CPU to the data storage device before initialization of the security device and intercept all said data access immediately after said initialization under the control of said processing means;
  wherein said processing means effects independent control of the host CPU and configuration of the computer in a manner so as to prevent unauthorized access to the storage device on said intercepting means intercepting said data access immediately after said initialization.

Preferably, the security device includes program memory means independent of the memory of the computer and the storage device to unalterably store and provide computer programs for operating the processing means in a prescribed manner to control said access.

Preferably, the prescribed profile of access comprises a prescribed allocation of predetermined levels of access permitted for an authorized user of the computer to prescribed partitions or zones of the storage device.

Preferably, the security device is adapted to be connected only in line with the data access channel between the host CPU and the storage device, and off the main data and control bus of the host CPU.

In accordance with another aspect of the present invention, there is provided a method for securing and protecting a storage device for storing data to be handled by a computer from unauthorized access, the computer having a host central processing unit (CPU) and memory used by the host CPU to load programs in order to operate the computer and storage device, the method comprising:

controlling access between the host CPU and the storage device independently of the host CPU;

blocking all data access by the host CPU to the storage device during initialization of the computer; and intercepting all said data access during the start up sequence after said initialization to effect independent control of the host CPU and configuration of the computer in a manner so as to prevent unauthorized access to the storage device thereafter.

Preferably, the method includes unalterably storing computer programs for effecting said controlling access in a location separate from the memory and not addressable by the host CPU.

Preferably, said login identification and passwords of authorized users and the prescribed profile of access thereof form part of said critical data and control elements and the verifying includes comparing the entered login identification and password with the login identification and passwords within said critical data and control elements and authenticating a user if there is match.

Preferably, the prescribed profile of access comprises a prescribed allocation of predetermined levels of access permitted for an authorized user to prescribed partitions or zones of the storage device.

In accordance with another aspect of the present invention, there is provided a security device for a computer having a host central processing unit (CPU), memory used by the host CPU to load programs in order to operate the computer and a storage device for storing data to be handled by the computer, the security device comprising:

blocking means for selectively blocking data access between the host CPU and the storage device; and authentication means to authenticate a user of the computer having a prescribed profile of access to the storage device;

wherein said blocking means maintains said blocking data access until said authentication means completes correct authentication of the user of the computer.

Preferably, the security device includes processing means independent of the host CPU for controlling the operation of said blocking means for blocking access between the host CPU and the storage device in response to said authentication means.

Preferably, the blocking means blocks all data access by the host CPU to the data storage device before initialization of the security device and includes intercepting means to intercept all said data access immediately after said initialization under the control of said processing means.

Preferably, said processing means effects independent control of the host CPU and configuration of the computer in a manner so as to prevent unauthorized access to the storage device, upon said intercepting means intercepting said data access immediately after said initialization and before loading of the operating system of the computer.

Preferably, said authentication means enables a software boot of the computer to be effected after correct authentication of the user, and said processing means permits normal loading of the operating system during the start up sequence of the computer following said software boot.

Preferably, said processing means controls said blocking means to effect blocking access to the storage device after correct authentication of the user in accordance with the prescribed profile of access of the user.

Preferably, the security device includes program memory means independent of the memory of the computer and the storage device to unalterably store and provide computer programs for operating the processing means in a prescribed manner to control said access.

Preferably, the security device includes memory store means independent of the memory means and the storage device of the computer to store critical data and control elements associated with the basic operation of the computer and access to the storage device.

Preferably, said critical data and control elements are supplied to and used by the host CPU for verification of the storage device and operating the computer independently of the storage device during the start up sequence of the computer.

Preferably, the authenitication means includes a login verifying means to enable a user of the computer to enter a login identification and password and have that login identification and password verified to authenticate said user being an authorized user of the computer having a prescribed profile of access to the storage device before allowing the start up sequence of the computer to proceed further.

Preferably, said login identification and passwords of authorized users and the prescribed profile of access thereof form part of said critical data and control elements and said login verifying means accesses said critical data and control elements to effect authentication of a user.

Preferably, the prescribed profile of access comprises a prescribed allocation of predetermined levels of access permitted for an authorized user of the computer to prescribed partitions or zones of the storage device.

Preferably, the security device is adapted to be connected only in line with the data access channel between the host CPU and the storage device, and off the main data and control bus of the host CPU.

In accordance with another aspect of the present invention, there is provided a method for securing and protecting a storage device for storing data to be handled by a computer from unauthorized access, the computer having a host central processing unit (CPU) and memory used by the host CPU to load programs in order to operate the computer and storage device, the method comprising:

selectively blocking all data access between the host CPU and the storage device; and authenticating a user of the computer having a prescribed profile of access to the storage device;

wherein said blocking of data access is maintained until the user of the computer is correctly authenticated.

Preferably, said selective blocking comprises controlling access between the host CPU and the storage device independently of the host CPU.

Preferably, said selective blocking occurs during initialization of the computer and includes intercepting all said data access during the start up sequence immediately after said initialization and before loading of the operating system of the computer to enable independent control of the host CPU and configuration of the computer in a manner so as to prevent unauthorized access to the storage device.

Preferably, the method includes performing a software boot of the computer after correct authentication of the user, and allowing normal loading of the operating system during the start up sequence of the computer thereafter.

Preferably, the method includes controlling blocking access to the storage device after correct authentication of the user in accordance with the prescribed profile of access of the user.

Preferably, the method includes unalterably storing computer programs for effecting said controlling access in a location separate from the memory and not addressable by the host CPU.

Preferably, said authenticating includes enabling a user of the computer to enter a login identification and password and verifying the same to establish whether the user is an authorized user of the computer having a prescribed profile of access to the storage device before allowing the start up sequence of the computer to proceed further.

Preferably, said login identification and passwords of authorized users and the prescribed profile of access thereof form part of said critical data and control elements and the verifying includes comparing the entered login identification and password with the login identification and passwords within said critical data and control elements and authenticating a user if there is match.

Preferably, the prescribed profile of access comprises a prescribed allocation of predetermined levels of access permitted for an authorized user to prescribed partitions or zones of the storage device.

BRIEF DESCRIPTION OF THE DRAWINGS

The invention will be better understood in the light of the following description of one specific embodiment thereof. The description is made with reference to the following drawings, wherein:

FIG. 5 is a flow chart showing the various states of operation of the security device from power on;

DETAILED DESCRIPTION

The embodiment is directed towards a personal computer (PC) system incorporating a security device for protecting a storage media of the computer system, which in the case of a PC may be one or more storage devices generally in the form of a hard disk drive (HDD).

Figure 1:
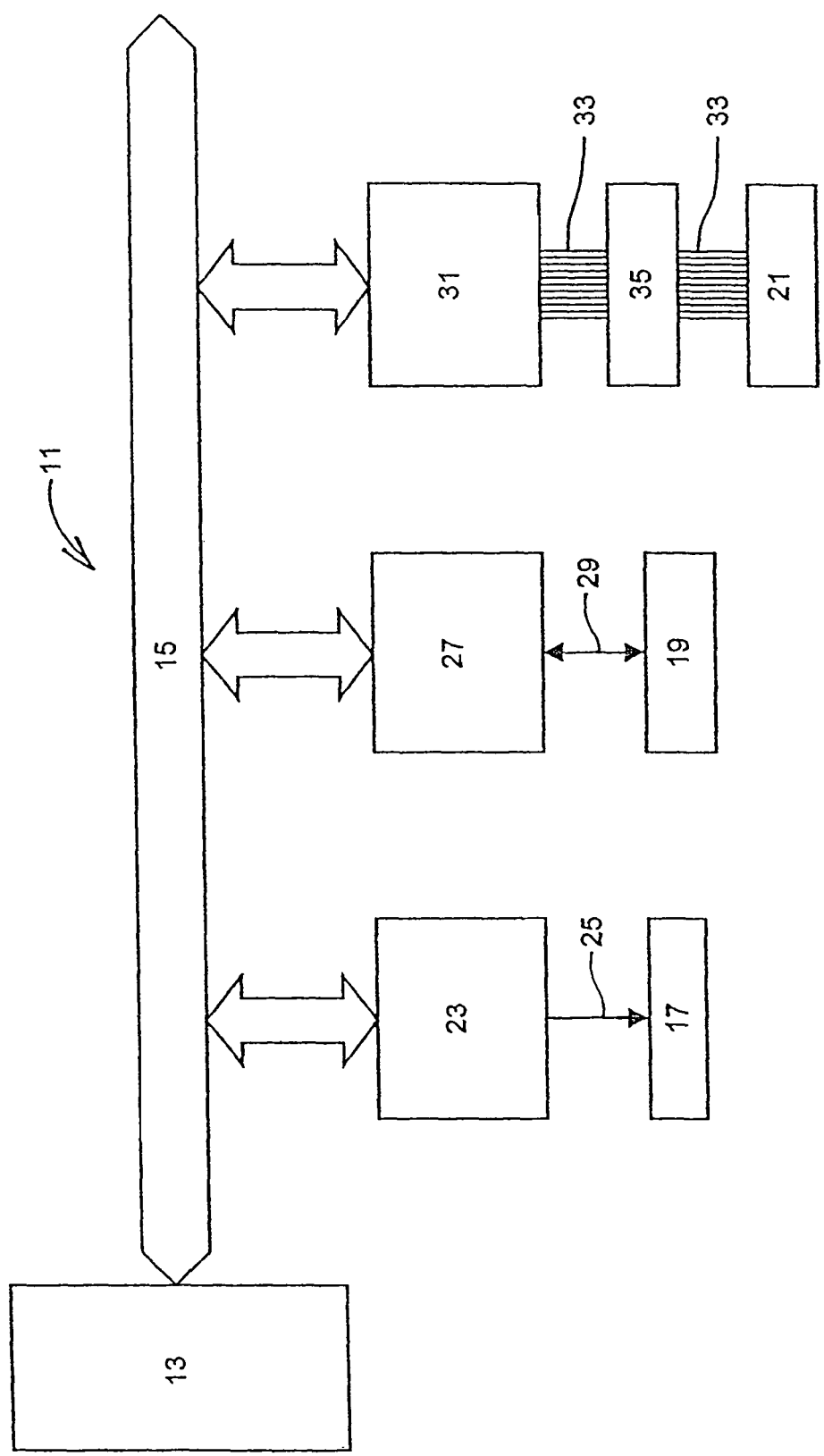
FIG. 1 is a schematic box diagram of a typical computer system showing the physical location of the security device relative to the host CPU, main bus, interface logic and various peripheral devices.

As shown in FIG. 1 of the drawings, the computer system 11 generally comprises a central processing unit (CPU) 13 and a plurality of peripheral devices, which are connected via a main CPU address and data bus 15. The peripheral devices include a monitor 17, a keyboard 19 and one or more storage devices 21. In the present embodiment, the storage devices 21 communicate according to the ATA (AT attachment) standard and thus require an ATA channel to be provided between them and the remainder of the computer system 11.

These peripheral devices are connected to the main CPU bus 15 via appropriate interface logic 23, 27 and 31, each comprising decode logic and device I/O (input/output). The interface logic is characterised to allow communication between the CPU 13 and the particular peripheral device.

In the case of the monitor 17, the interface logic 23 therefor is integrated with a video adapter and is connected via a standard video cable 25 to the monitor; in the case of the keyboard 19, the interface logic 27 therefor is integrated with a keyboard port and is connected via an appropriate keyboard cable 29 to the keyboard; and in the case of the storage device(s) 21, the interface logic 31 therefor is integrated with an ATA adapter and is connected via an ATA cable 33 to the storage device(s) to provide the ATA channel.

The security device 35 of the present embodiment is physically interposed inline with the ATA cable 33 between the ATA adapter provided on the device interface logic 31 and the storage devices 21. The ATA standard supports most types of storage device, including hard disk drives, CD-ROMS (which actually adopts the ATA/ATAPI enhancement to the ATA standard), flash memory, floppy drives, zip drives and tape drives.

Under the ATA standard, two discrete storage devices may be controlled via the single interface logic 31 and ATA cable 33. Hence reference will be made hereinafter to "storage media", which will comprise either one or two storage devices, and will be used interchangeably with "storage device".

In the case of PC's, the main type of storage device is the HDD. Most HDD's conform to the IDE (Integrated Drive Electronics) hard drive standard or the EIDE (Enhanced IDE) hard drive standard, whereby the controller for the disk drive is located on the HDD itself as opposed to being directly connected to the motherboard of the PC.

Although not shown in the drawings, other embodiments of the computer system may involve storage devices connected to the main computer system via a SCSI (Small Computer Systems Interface) standard, which has its own corresponding interface logic. Accordingly, in the case of storage devices connected to the PC in this manner, the security device 35 would similarly be interposed between the SCSI drive device and the interface logic thereof.

Figure 2:
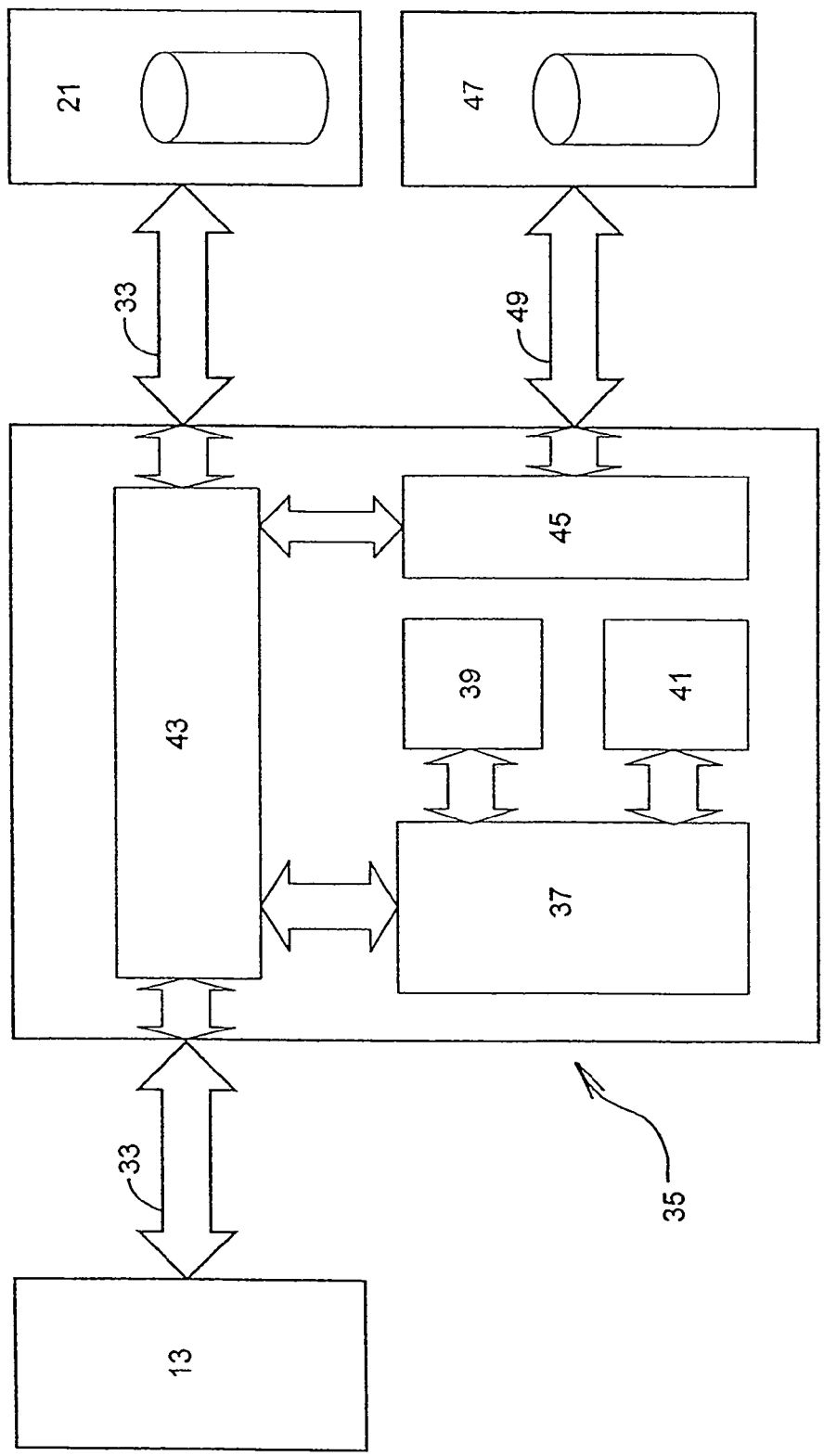
FIG. 2 is a schematic box diagram of the security device itself showing its general functional make-up.

As shown in FIG. 2 of the drawings, the security device 35 generally comprises a CPU 37, RAM (random access memory) 39, flash ROM (read only memory) 41 and bus control and interface logic 43, which in the present embodiment is adapted to the ATA standard for the purposes of protecting the ATA storage device 21. The bus control and interface logic is typically embodied in FPGA (Field Programmable Gate Array) and/or ASIC (Application Specific Integrated Circuit) devices that are connected so as to intercept and permit control of all communications between the host CPU 13 and the disk storage devices 21 under the control of the security device CPU 37.

The security device 35 also includes a secure media interface 45 that allows a separate secure storage media 47 to be connected to the security device via a custom interface 49.

The security device CPU 37 operates according to a prescribed application program stored in the flash ROM 41 and which is loaded into the RAM 39 on start up and becomes the operating system for the security device. The CPU 37 communicates with the bus control and interface logic 43, which is interposed in line with the ATA cable 33 to intercept communications between the host CPU 13 and the storage media 21. The secure media interface 45 is interposed between the bus control and interface logic 43 and the custom interface 49 to facilitate communications between the host CPU 13 and the secure storage media 47 under the control of the CPU 37. This aspect of the operation of the security device is the subject of a separate invention and will not be further described herein.

The functionality of the application program stored in flash ROM 41 and the operation of the security device 35 will now be described with reference to the remaining drawings.

The application program stored in flash ROM 41 for the security device 35 is generally designed to intercept and control the computer system's boot process and provide authentication by means of a login ID and password before access to the protected storage media is permitted. Accordingly, the location of the security device 35 between the host CPU 13 and the storage media 21 is particularly designed so that the security device is able to filter all requests for information and data flowing to and from the storage media. The security device 35 forwards these requests to the storage media as appropriate, based on predetermined user profiles that are set up by a user having an administrator profile, which profiles are stored within the security device itself. These profiles are based on access to different partitions and/or files within the storage media. Thus the designated administrator can set up data protection on a partition-by-partition and/or file-by-file basis in a manner that will be described in more detail later.

In order to fully understand the operation of the security device, an appreciation is required of the normal boot process followed by a standard computer system. This boot process will now be described with reference to FIG. 3 of the drawings.

Figure 3:
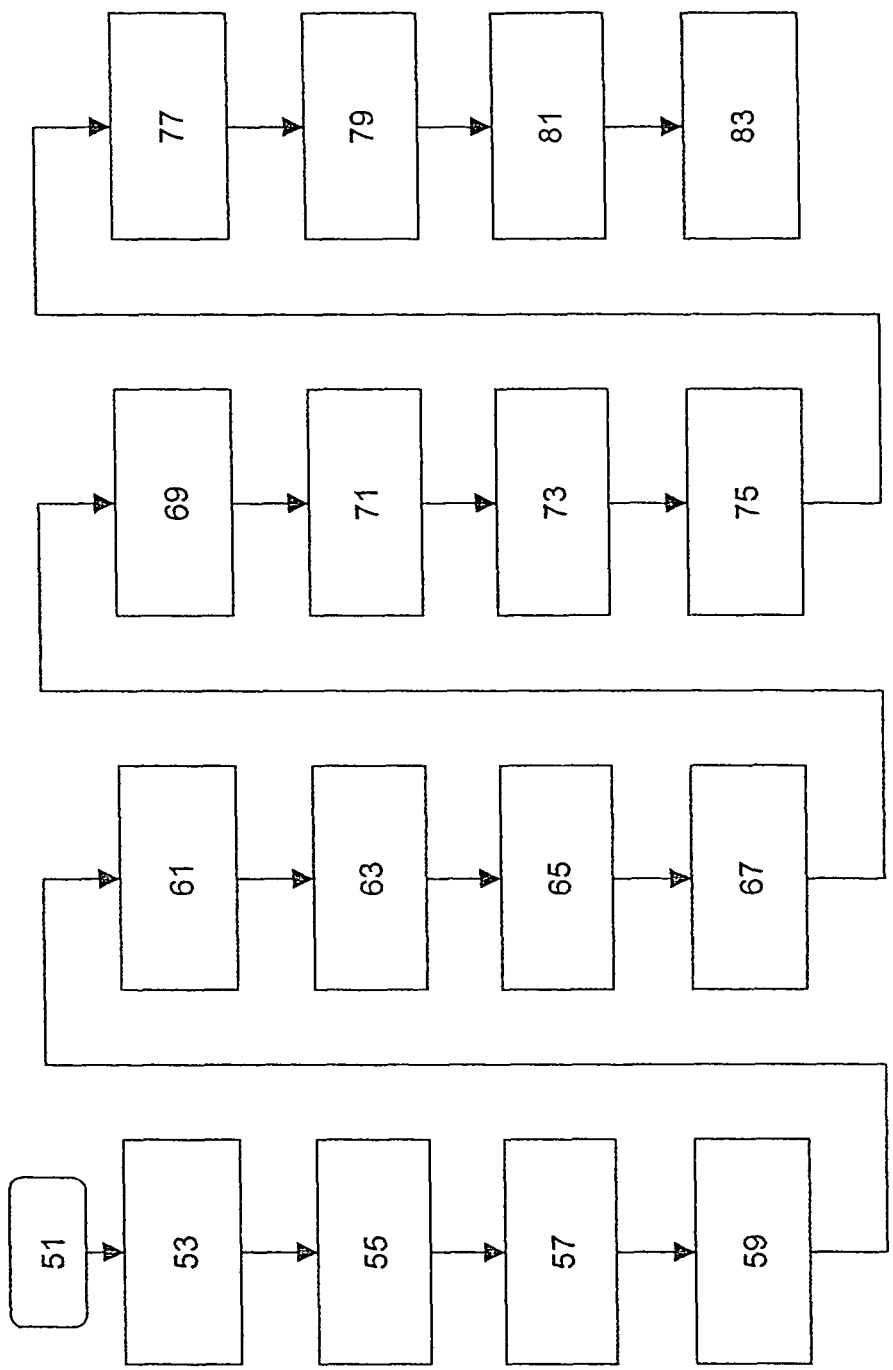
FIG. 3 is a flow chart showing the start up sequence of a normal computer that is not equipped with the security device.

As shown in FIG. 3, the normal start up sequence followed by a PC commences as indicated at step 51 with power on shown at 53. This is also known as a "cold" boot, whereby all left over data from the host CPU's internal memory registers and RAM is cleared and the program counter of the CPU is set with the starting address to commence the boot process. This address is the beginning of a boot program stored permanently in the ROM BIOS (Basic Input Output System).

The next step 55 involves the CPU using the address to find and invoke the ROM BIOS boot program. The ROM BIOS program goes through an initialization phase that includes setting up hardware and software interrupt vectors and invoking a series of system checks known as power-on self-tests (POSTs) as represented by step 57.

The POST process involves a series of tests to ensure that the RAM of the PC is functioning properly. It then conducts another series of tests, which instruct the host CPU to check that the various peripheral devices, such as the video card and monitor 17, keyboard 19 and storage media 21, are present and functioning properly.

On completing the POST, the BIOS then looks for addresses of BIOS extensions at step 59 that are held in the ROMs of peripheral devices to see if any of them have an extended BIOS to run.

The first of these BIOS extensions is associated with the video card. This BIOS extension initialises the video card to operate the monitor as shown at step 61.

Upon completing initialization of the video card, the BIOS then proceeds at step 63 to run other BIOS extensions for those peripheral devices that have them.

The BIOS then proceeds to display the start up screen at step 65, before proceeding with conducting further tests on the system at step 67, including the memory test at step 67, which is displayed on the screen.

The BIOS then performs a "system inventory" or equipment check to determine what type of peripheral hardware is connected to the system at step 69. With respect to HDD storage media, the BIOS program causes the host CPU to interrogate the HDD requesting details such as the drive standard (ATA or SCSI), which level of standard (eg whether it is the old standard ATA 1-3 or the new standard ATA 6) the number of cylinders/heads/sectors, and whether it is capable of running in other modes. This stage of interrogation of the HDD is known as "drive ID".

The BIOS then proceeds to configure "logical" devices, such as Plug and Play devices, at step 71 and displays a message on the screen for each one it finds.

The summary screen is then displayed at step 73 indicating the configuration of the computer system. The BIOS then checks for the specified boot sequence at step 75, where the order of priority of storage media to be checked for the location of a valid boot sector, from which the operating system of the computer may be loaded, is specified. The normal order is to check the floppy disk drive (A:), then the hard disk (C:) or vice versa, or the CD ROM drive.

Having identified the order of priority, the BIOS causes the CPU at step 77 to look for boot information in each drive in sequence until a valid boot sector is located.

The BIOS undertakes this process by invoking the software interrupt vector "int 19 at step 79, which stores the address of the particular peripheral device in a software interrupt vector table that is set up during the initialization phase of the BIOS.

For example, if the target boot drive is the HDD, the CPU looks for a master boot record or boot sector at cylinder 0, head 0, sector 1 (the first sector on the disk), at the address of the device specified in the table: if it is searching a floppy disk, it obtains the address of the floppy disk drive from the table and looks for a volume boot sector at the same location on the floppy disk.

A valid boot sector is determined by the CPU checking the signature of the "ID byte", which normally comprises the first two bytes of the boot sector. If the signature signifies that a boot sector is present, the CPU then proceeds with loading the boot sector at step 81 into RAM and executes or runs the boot loader at step 83 for loading the various operating system files.

In the case of the DOS operating system, the hidden files MS DOS.SYS, IO.SYS and COMMAND.COM are loaded and executed and then the files CONFIG.SYS and AUTOEXEC.BAT are loaded and run to complete configuration of the computer system and allowing appropriate application programs to be initiated for subsequent operation of the computer system.

In the case of the present embodiment incorporating the security device 35, the security device is programmed to block out all access of the host CPU 13 to the protected storage media 21 by intercepting the boot process at an early stage during operation of the BIOS. In addition, the security device provides for a custom boot sector to be loaded into the RAM of the host CPU 13, which then executes an authentication application program requiring correct user authentication before allowing the computer system to proceed with its normal boot sector operation and operating system loading. Since the latter operations require access to the protected storage media 21, this methodology ensures that such access is undertaken only after the supervisory control of the security device 35 has been establish on a user-by-user basis.

Figure 4A:
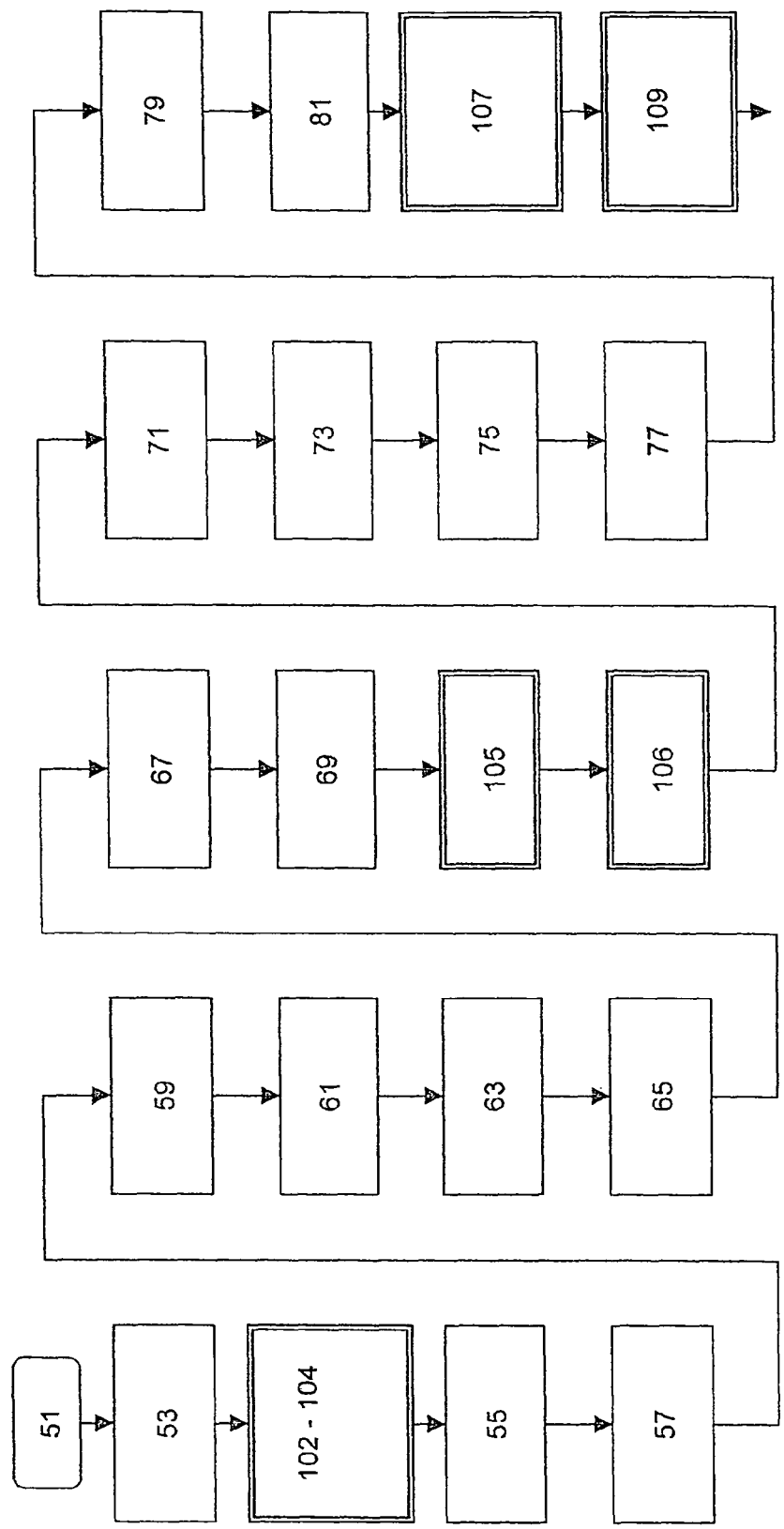
FIGS. 4A and 4B are flow charts showing the start up sequence of a computer system equipped with the security device.
Figure 4B:
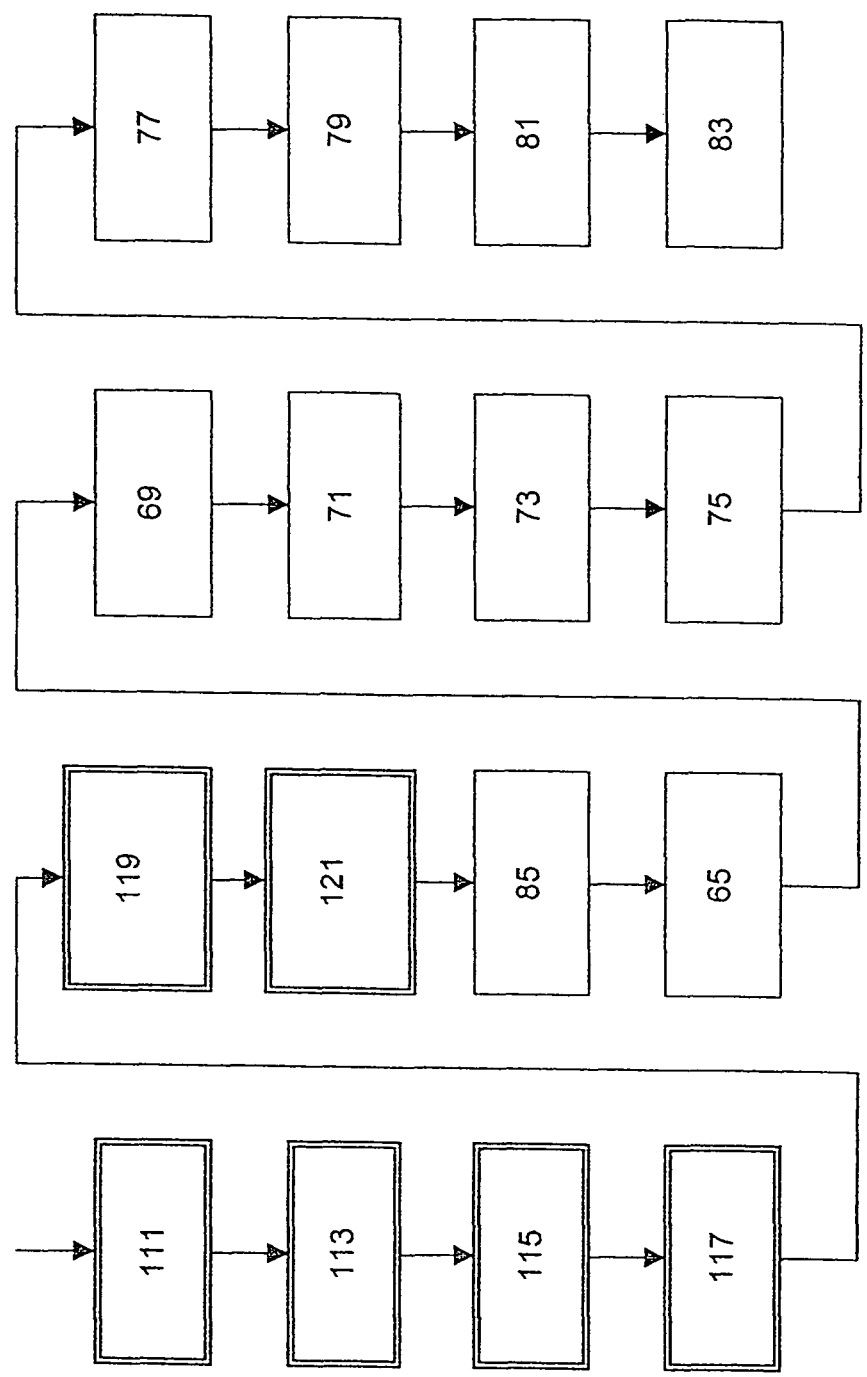
Figure 5:
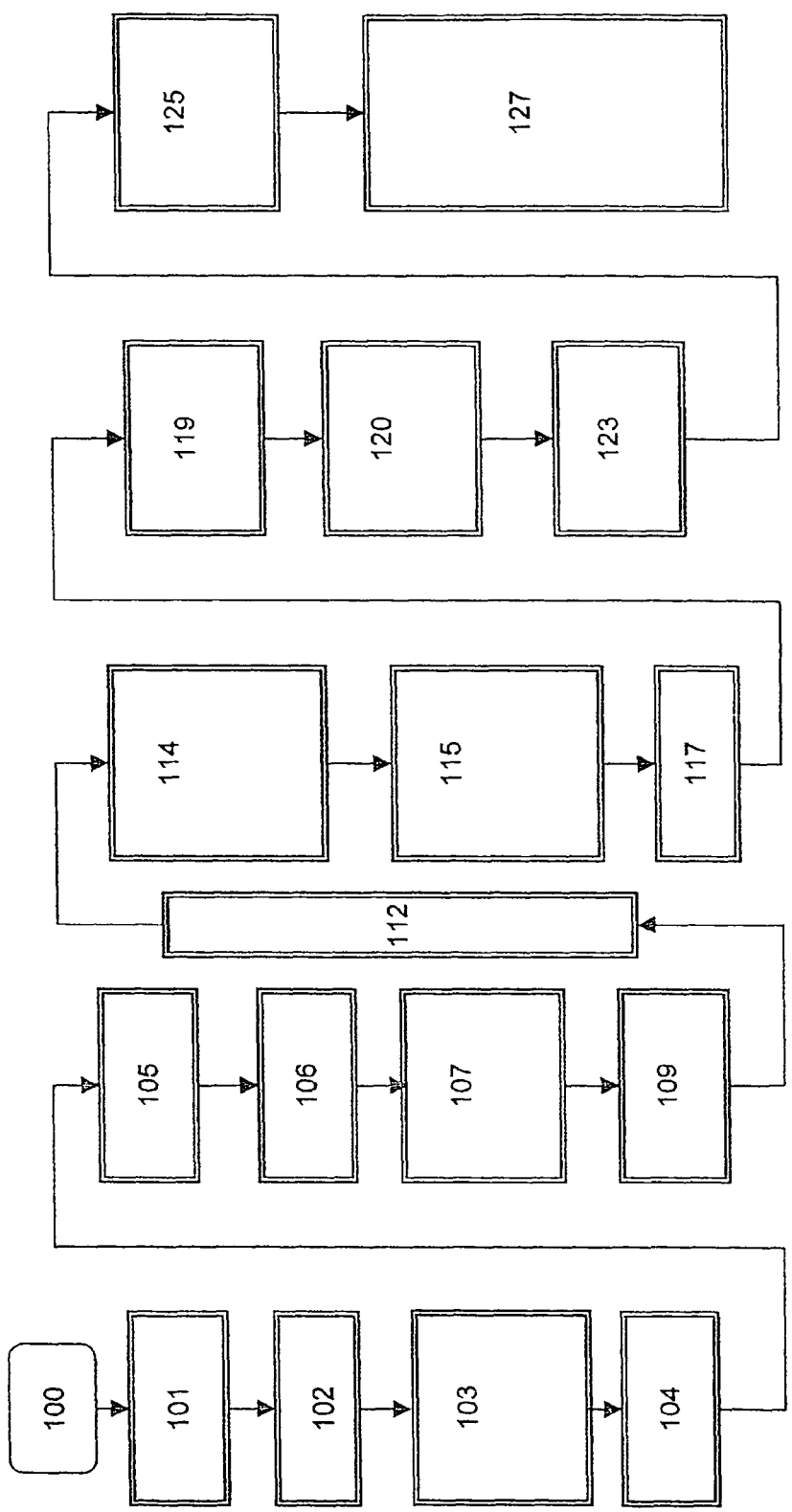

This manner of operation of the security device 35 is best explained in conjunction with FIGS. 4A, 4B and 5 of the drawings, which outline the operation of the computer system start up sequence with the security device installed in the manner previously described.

In this arrangement, the cold boot process of the computer system 11 commences with the start and power on steps 51 and 53, as in the case of the normal computer start up sequence. At power on, however, the security device 35, which is separately powered, undergoes its own initialization phase commencing with the start step 100, whereupon all of its onboard resources are initialised at step 101 and its operating system program is loaded and run to enter its first phase of operation as shown at step 102. The initialization phase of the security device 35 should proceed far more quickly than it takes the BIOS of the computer system 11 to initialise, due to the reduced overheads of the security device as compared with those of the computer system. Accordingly, the operating system program stored in flash ROM 41 immediately invokes the security device CPU 37 at step 103 to control the bus control and interface logic 43 and intercept all communications from the host CPU 13 to the storage media along the ATA channel, so that no communications are allowed between the host and the protected storage media 21 along the ATA cable at all during this time. Prior to this time the bus control and interface logic 43 is not configured and so no access to the storage media is available prior to or during the initialization phase of the security device along the ATA cable, in any event.

The security device CPU 33 then places a drive busy signal on the ATA channel to inform the host CPU 13 of the status of the storage media 21 and proceeds with requesting the "drive ID" from the storage media, as shown at step 104.

The operations of the security device 35 during this time occur quite independently of the BIOS, whereby the BIOS proceeds with performing steps 55 through to 69, in accordance with its normal operation, until the "drive ID" check is performed by it at step 69.

During steps 55 to 69, the security device 35 continues to block of all data communications from the host CPU 13, or any other external device, with the storage media 21. During this "drive busy" phase, the CPU 37 of the security device 35 is in a state waiting for the "drive ID" information from the storage device. Once the security device CPU 37 receives the "drive ID" information from the storage media 21, the CPU 37 stores this in its RAM 39 and asserts a "drive ready" signal on the ATA channel to indicate to the host CPU 13 that the storage media 21 is ready to provide the "drive ID".

If the host CPU 13 has already reached the "drive ID" stage 69 and has been polling the drive interface logic 31 during the "drive busy" phase for less than the requisite time period, or more normally when the BIOS finally reaches the "drive ID" stage at step 69 after the security device CPU 37 has signalled the "drive ready" phase on the ATA channel, the host CPU 13 issues a request to the driver interface logic 31 of the "drive ID".

Once this request is made at step 69, the security device CPU 37 intercepts the request at 105, continuing to block access to the storage media 21, and provides the host CPU 13 with the "drive ID" of the HDD(s) at step 106.

The BIOS provides for a thirty one second period for the HDD to respond with the "drive ID" information stored describing it. Accordingly if the security device CPU 37 is not able to provide the "drive ID" information within this time, from the time that the BIOS reaches the "drive ID" equipment check stage 69, for whatever reason, then the BIOS will indicate that the storage media 21 at that location is not functional and bypass it. As the security device 35 is expected to be well and truly initialised and operational by this time, such a delay would generally be indicative that there is indeed a problem with the protected HDD(s).

After supplying the host CPU 13 with the "drive ID", the security device 35 advances to its next state, still blocking data communications between the host CPU 13 and the protected storage media 21, whilst the BIOS program proceeds with its normal boot up procedure at steps 71 through to 81, until it arrives at step 81 involving loading of a valid boot sector.

During this state, the CPU 37 of the security device 35 waits for a boot sector request from the host CPU 13 to the driver interface logic 31. On receiving the BIOS request, instead of loading the boot sector stored on the protected storage device, the security device supplies a "custom" boot sector stored on its own flash ROM 41 to the host CPU as indicated by step 107. The CPU 13 then runs the boot loader according to the custom boot sector, which causes a prescribed authentication application program stored within the flash ROM 41 to be loaded at step 109 and then executed at step 111.

In the present embodiment, the valid boot sector must be that which is stored on the protected storage media 21; otherwise the security device 35 never advances beyond its blocking state. Such an arrangement ensures the integrity of the security of the system by not allowing any external operating system, other than that which is provided on the protected storage media 21, to effect control of the host CPU 13 for the purposes of communicating with data stored on the protected storage media 21.

Thus, in the normal operation of the computer system, where the BIOS targets the protected storage media 21 for the purposes of locating and loading the boot sector, the BIOS causes the host CPU 13 to request the boot sector from the protected storage media 21.

The authentication application program essentially comprises a prescribed login application that only allows an authenticated user to continue with operation of the computer system 11. A user that is unable to be authenticated by the prescribed login application cannot continue to use the computer system. The detailed operation of the login application will be described in more detail later, but for the purpose of describing the system start up sequence, will be described in general terms.

Moreover, the login application requires the user to enter a valid login name and password for the computer system to progress beyond the initial login stage. The login application in the present embodiment is designed to allow only three attempts at entering the correct login name and password. It should be appreciated that in other embodiments the number of login attempts that may be allowed can be different, and in extreme security applications, may be limited to just one attempt. If the correct login name and password are not entered by the third attempt, the application program invokes a system halt (wherein the system hangs or loops indefinitely), which requires the entire cold boot process to be repeated.

Valid login names and passwords associated therewith for all users permitted access to the storage media 21 are stored in the flash ROM 41 of the security device 35. Accordingly, various communications proceed during this login phase between host CPU 13 under the control of the authentication application program and the security device CPU 37 as shown at 112.

If the login is successful, as represented by step 113, the authentication application program proceeds in a manner to be described in more detail later. With respect to the security device 35, once the user has been authenticated, the data access profile previously stored for that particular user in the flash ROM 41 is set at 114 to determine the protocol of operation between the authentication application program and the operating system of the security device thereafter. During this phase of operation, the security device CPU 37 passes details of the data access profile of the particular user to the host CPU 13 for display. Depending upon the access level of the user, possibly login and password information as well as data access profile information of other users having access to the storage media 21 are passed over to the host CPU for display and possible editing under the authentication application program.

This phase of operation continues until the user invokes an "allow boot" process at step 115. Setting this status causes the security device 35 to enter the second phase of its operation at step 117. At this stage, the operating system being run by the security device CPU 37 configures the security device 35 to set the data access profile of the authenticated user at step 119, which profile is thereafter enforced for determining the host CPU 13 access to the protected data storage media 21.

The operating system of the security device 37 then signals the authentication application program run by the host CPU 13 at 120 that the security device bus control and interface logic 43 is configured to adopt the data access profile of the user, whereupon the application program at 121 issues the software interrupt vector to the host CPU 13 invoking a "warm boot". The appropriate soft boot vector is then loaded and the host CPU 13 causes a soft system re-start or warm boot at step 85.

During the software reset, the security device 35 then enters a waiting state for the boot sector request as indicated at 123, whilst enforcing the data access profile for all data communications between the host CPU 13 and the protected storage media 21 as shown at 125. Importantly, whilst the computer system 11 is undergoing the system reset, its security device 35 still remains active and fully operational during this time.

A software reset "warm boot" invokes a special subroutine of the BIOS program that performs an abbreviated start up sequence. Moreover, essentially steps 51 to 63 are bypassed and the BIOS program proceeds with operation at about step 65.

At step 69, which invokes the equipment check involving the "drive ID" with respect to the HDD, the operating system of the security device 35 no longer intercepts the request from the host CPU 13 to the protected storage media 21, as long as the access to the HDD of the storage media is in conformance with the particular user data access profile that has been set by the operation of the security device 35 during the first phase of its operation. Such access will be permitted in most cases, unless the administrator has specifically barred the authenticated user from HDD access.

Thus, the security device 35 allows the HDD of the storage media 21 to respond directly to the request with the "drive ID", whereupon the host CPU 13 advances the BIOS program through steps 71 to 81, in accordance with the normal boot up sequence of the BIOS.

Importantly, the initial part of the data access profile enforcement process involves the operating system of the security device 35 blocking access to the protected storage media 21 until a valid BIOS boot sector request is detected from the host CPU 13 via the ATA cable 33. Importantly, the security device CPU 37 rejects all other commands to the protected storage media during step 125.

On the BIOS requesting a boot sector from the particular HDD of the protected storage media 21, the bus control and interface logic 43 of the security device allows the request to proceed.

On the BIOS receiving a valid signature from the storage media, the host CPU 13 then proceeds with loading the prescribed boot sector from the storage media 21 at step 81 and proceeds running the boot loader to load the operating system from the storage media 21 at step 83, in accordance with the normal operation of the computer system.

Following receipt of a valid BIOS request for the boot sector on the storage media 21, the security device 35 then adopts a monitoring state of all media channel activity along the ATA cable 33 and configures the bus control and interface logic 43 of the security device according to the set data access profile of the authenticated user as indicated at 127. Accordingly, the security device 35 only allows or disallows access to relevant partitions and files within the storage media 21 in conformance with the set user data access profile, whereby data that the user is not permitted to access cannot be accessed by the user or by any virus, errant application program or unauthorized access.

The security device 35 maintains this monitoring or supervisory state until the computer system 11 is shutdown and powered off. Once power is switched off to the security device, all dynamic memory is erased and access to the storage media is barred until the device is powered up and initialised again.

Figure 6:
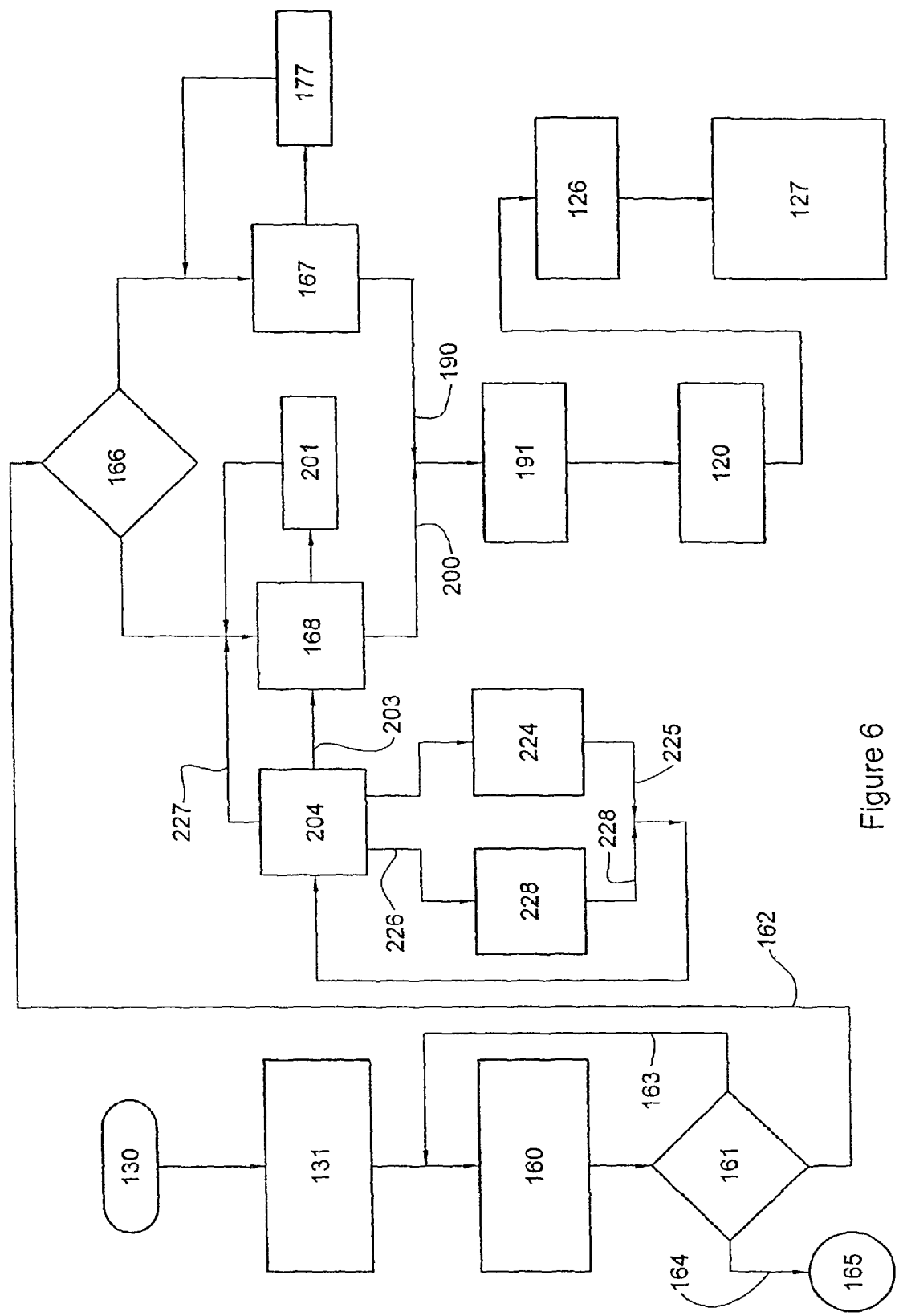
FIG. 6 is a flow chart showing the various processes performed by the authentication application program.
Figure 7A:
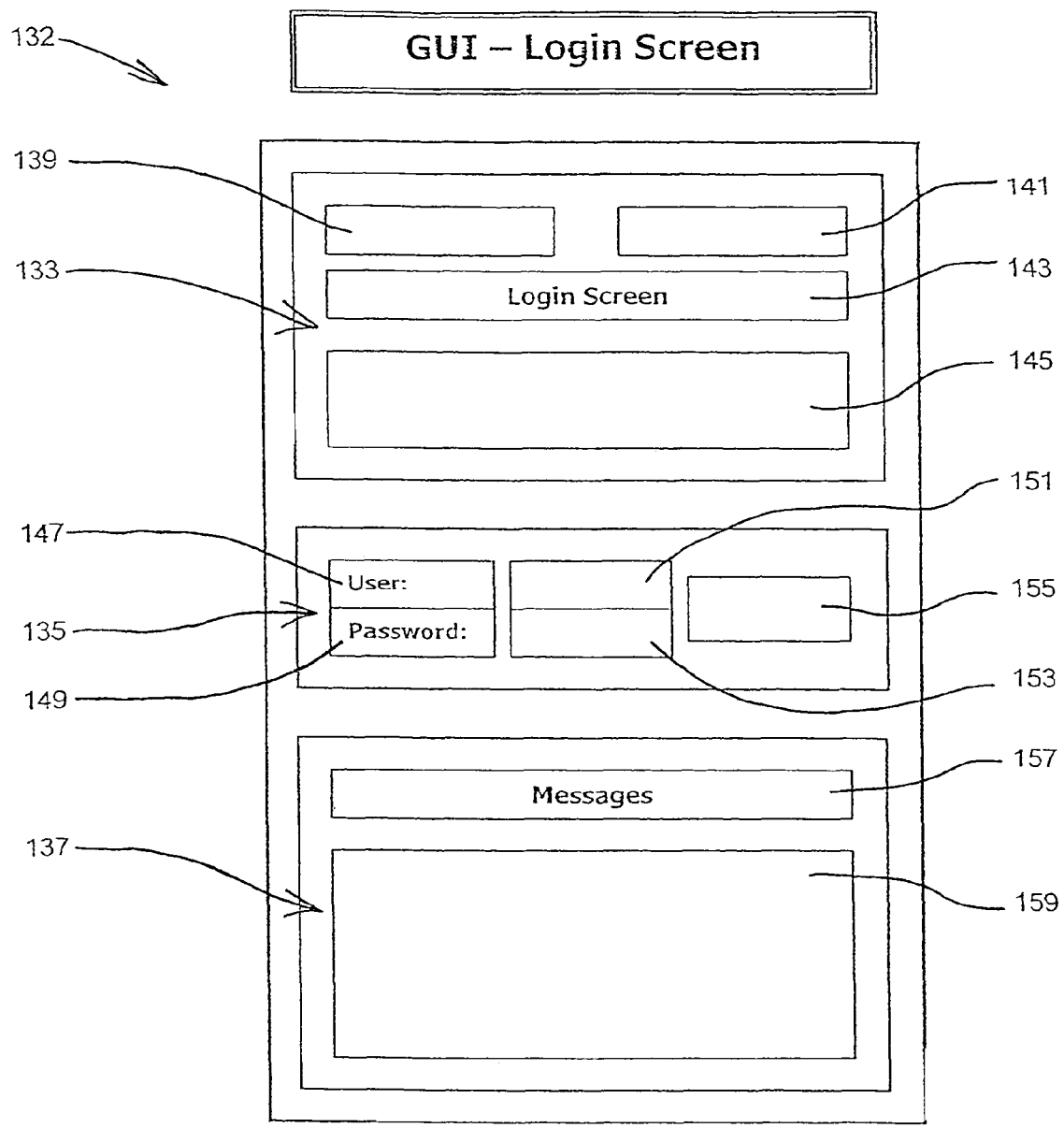
FIG. 7A shows the graphical specification format of the general login graphical user interface (GUI) screen.

Now having described the overall operation of the security device 35, the authentication application program will now be described in more detail with respect to the flow chart shown in FIG. 6 and the GUI screen graphical specification formats as shown in FIGS. 7A through to 7E.

The user authentication application program, on being loaded by the boot loader at step 109 and run by the host CPU at step 111, commences at 130 and initially causes a user login screen to be displayed at step 131, the graphical specification for which is shown at FIG. 7A of the drawings. The screen 132 is divided into a heading frame 133, a login frame 135 and a message/log frame 137.

The heading frame 133 has provision for the product trade mark at 139, the version number at 141, the screen name at 143 and provision for display of legal warning notices at 145.

The login frame 135 includes banners for the text "user:" at 147 and the text "password:" 149, with frames for respectively entering the user identification or "user ID" at 151 and the user password at 153. The message/log frame comprises a banner for displaying the text "messages" at 157 and a message frame 159, which displays status messages issued by the security device to the authentication application program as a scrollable list. A login button 155 is also provided in order for the user to invoke the processing of the user and password entries for authentication purposes by the security device.

Whilst the screen 132 is displayed, the application program waits for the login ID and password to be entered as shown at step 160. Activating the login button 155 involves the authentication application program invoking a process at 161 causing the host CPU 13 to pass the login details entered on the screen to the security device 35, whereupon the operating system of the security device causes the security device CPU 37 to compare the received login information with stored login information provided in the flash ROM 41. Depending upon whether there is a valid match between the entered user and password information via the login screen and the stored user and password information, the security device CPU 37 returns either a valid or invalid authentication signal to the host CPU 13.

In the case of there being a valid authentication as shown at 162, the CPU 37 also provides additional information concerning the user type and associated device information depending upon the stored data access profile of the particular user.

In the case of there being an invalid authentication, a counter is incremented/decremented to record that a first unsuccessful attempt at authentication has been made and an appropriate message is displayed to the user on the message/log frame 137, indicating the failed status of the authentication attempt as shown at 163. As previously described, on three unsuccessful authentication attempts as shown at 164, the authentication application program causes a shutdown interrupt vector to be invoked by the host CPU 13 at 165, resulting in a complete shutdown of the computer system 11 requiring a cold boot to restart the system.

Figure 7B:
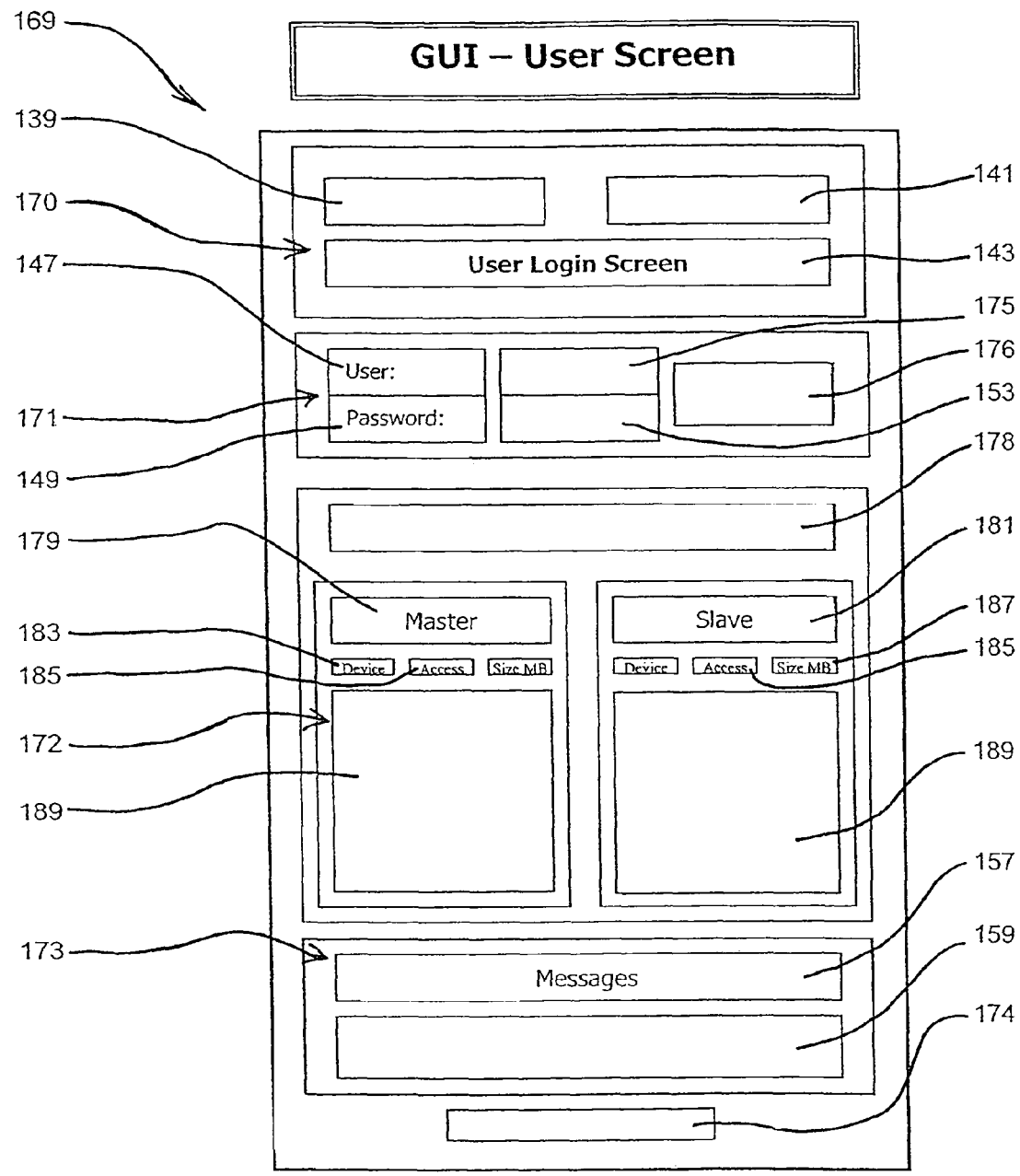
FIG. 7B shows the graphical specification format of the normal user type login GUI screen.
Figure 7C:
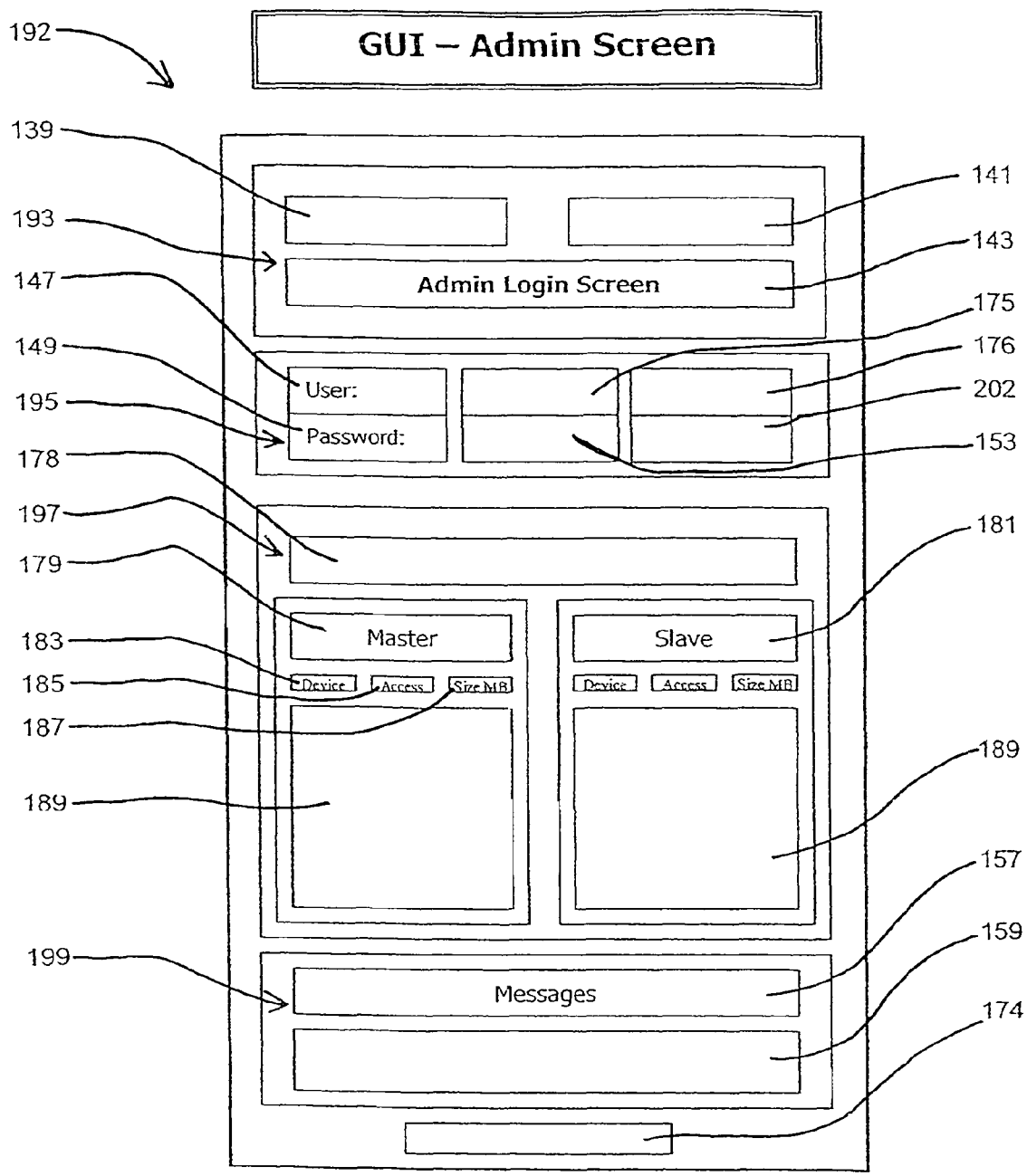
FIG. 7C shows the graphical specification format of the administrator type login GUI screen.

On valid authentication, the authentication application program then proceeds at 166 with displaying one of either two types of login screen, depending upon the user type. In the present embodiment, there are two user types, one being a normal user, for which the screen as shown by the graphical specification at FIG. 7B is displayed at step 167, and the other being an administrator for which the screen represented by the graphical specification at FIG. 7C is displayed at step 168.

The graphical specification for the normal user GUI screen 169 is generally divided into a heading frame 170, a login details frame 171, a device details frame 172 and a message/log frame 173. The screen also includes a launch system button 174 that will be further described.

The heading frame 170 is essentially the same as the heading frame 133 for the general login screen, where the same reference numerals have been used to identify corresponding attributes of the frame. In this case, however, the screen title is modified to represent that it is a user type login screen, as shown at 143 of the drawings.

The login details frame 171 is similar to the login frame 147 of the preceding screen and accordingly the same reference numerals have been used to identify corresponding attributes of the frame. The login details frame, however, includes a user ID display frame 175 to display the user ID as opposed to an entry frame in the proceeding screen. The login details frame also includes a new password accept button 176, which is used in conjunction with the password entry frame 153 to permit the user to change its password. Accordingly, activating the new password button 176 invokes a process within the authentication application program involving communication between the host CPU 13 and the security device CPU 37 to cause a change to the password stored within the flash ROM 41 of the security device for the particular user as shown at 177. A standard routine involving confirmation of the new password is adopted, before the password changes are completed.

The device details frame 172 includes a title banner 178, which displays the text "device information", as well as two further sub-banners displaying the text "master" at 179 and "slave" at 181. These sub-banners head regions for displaying information about the prescribed device or devices that are protected by the security device 35. In the present embodiment, up to two storage devices are allowed, which is normal under the ATA standard, one being denoted the "master" device and the other being denoted the "slave" device. The respective regions detailing the device information include three further sub-level banners for displaying the text "device" at 183, "access" at 185 and "size MB" at 187. Display frames 189 for each sub-banner are respectively provided below the device, access and size banners for listing the device details that the user is permitted to observe on the master and/or slave device, as set by the administrator.

For each observable device, the list displays:
the device number;
its access type for the user: and
the device size in MB (MegaBytes).
The access type lists one of five possible designations:
read only, which is displayed in red text;
read/write, which is displayed in green text;
invisible, which is displayed in yellow text;
read directory entry, which is displayed in grey text; and
delete, which is displayed in blue text.

The message/log frame 173 includes a title banner 157 for displaying the text "messages" and a display frame 159, which displays status messages provided by the security device as a scrollable list, similar to the preceding screen.

In the case of the user, the device information is only provided for display purposes and cannot be changed.

Now explaining the methodology behind the listings contained in the display frames 189 and the action provided thereby in more detail, in the present embodiment, the protected storage device is divided into zones or partitions that have different access level permissions depending upon the determination of the administrator. These partitions can be created in a known manner and are represented as separate devices for each type of storage device. For example, these partitions may comprise C:, D:, E: and F:. Thus, each user can have one of five types of access to these partitions, namely read only, read/write, invisible, read directory entry and delete.

Read only access means that the user can access all of the files existing in the designated partition, but can only read the file contents. The user has no write or delete permissions with respect to the files in that partition.

Read/write access means that the user can access all of the files existing in the designated partition and perform both read and write functions with respect to the file contents, but has no delete permissions with respect to those files.

Invisible access means that none of the files within the designated partition are accessable to the user in any form and are hidden, even to the extent that no file details can be listed or be visible at all in any directory listing of files for that partition available to the user.

Read directory entry access means that the user may be able to list file details such as names and attributes in any directory listing of files in the designated partition, but the user has no read, write or delete permissions in relation to any of the files in that partition.

Delete access is the highest level of access to any files within a designated partition, whereby the user not only has full read and write permissions, but also delete permissions in relation to all of the files in that partition.

When the user is ready to continue on with operation of the computer system 11, the launch system button 174 is activated as shown at 190, whereupon the authentication application program sends a signal to the security device 35 to set the "allow boot" status therein as by step 191. Setting the "allow boot" status invokes the commencement of the second phase of operation of the security device 35, as shown at step 117, allowing the system start up sequence to continue with the authenticiation application issuing a "warm boot" interrupt vector as step 120 in the manner as previously described. This halts the operation of the user authentication application program.

In the case of the user type being an administrator, the administrator screen as represented by the graphical specification shown in FIG. 7C is displayed to the user on the monitor via the authentication application program at step 168. The administrator type screen 192 is substantially similar to the user type screen and so the same reference numerals have been used to identify corresponding attributes between the two screens. Accordingly, the administrator type screen is divided into a similar heading frame 193, login details 195, device details frame 197 and a message/log frame 199.

With respect to the banner title 143 of the heading frame 193, the text is altered to indicate that the screen is for the administrator type login.

The device details frame 197 and the message/log frame 199 are substantially identical to the corresponding attributes of the user type screen and will not be described further. The launch system button 174 functions in an identical manner to the launch system button of the preceding screen, whereby activation of the same as shown at 200 invokes the commencement of the second phase of operation of the security device 135 as previously described.

Figure 7D:
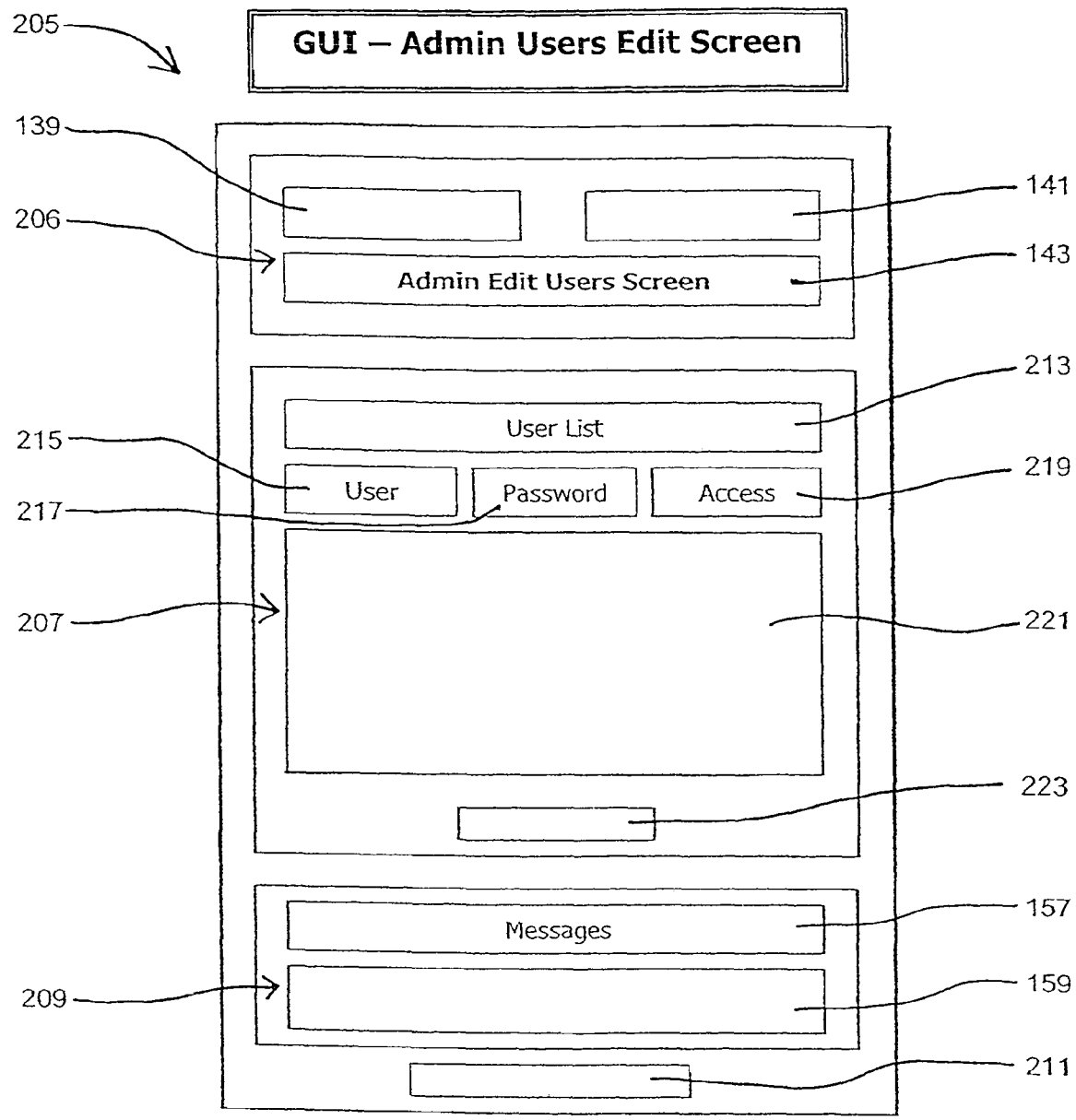
FIG. 7D shows the graphical specification format of the administrator's user edit GUI screen.

With the login details frame 195, the same facility for changing the password of the administrator is provided as shown at step 201, with a similar entry frame 153 and accept new password button 176, as in the case of the user type login. However, the login details frame also includes an edit users button 202, activation of which invokes an editing process within the authentication application program as shown at 203, allowing the administrator to create and edit data access profiles for individual users, so as to determine their data access profile for permitted access to the storage media 21. Activation of the button 201 causes the authentication application program to display at 204 an administrator editing screen to the user, the graphical specification of which is shown at FIG. 7D of the drawings.

The administrator users edit screen 205 is divided into a heading frame 206, an edit user details frame 207, a message/log frame 209 and a return to admin login button 211. The heading frame 206, apart from having an appropriately worded title banner 143 denoting the screen as being an administrator edit users screen is identical to previous heading frames. Similarly, the message/log frame 209 is substantially identical to the message/log frame with the proceding screens. Thus the same reference numerals have been used to identify corresponding attributes of each of these screens.

With respect to the edit users details frame 207, this comprises a title banner depicting the text "user list" as shown at 213 and sub-title banners depicting the text "user" at 215, "password" at 217 and "access" at 219. An editable frame 221 is provided below the sub-banners in which is displayed a scrollable and editable list of all users having access to the protected storage media 21. This list is derived from data stored within the flash ROM 41 of the storage device arising from communications between the host CPU 13, under the control of the authentication application program, and the security device CPU 37, under the control of the operating system thereof.

Each user entry in the list contains:
the user ID;
password; and
access button;
under the respective sub-title banners 215, 217 and 219.

Upon pressing the access button for a particular user, the access edit screen will appear for that user. The administrator editing process allows a user to be deleted by the administrator through the edit frame 221 by selecting their entry and pressing the ALT-d key sequence on the keyboard.

A create new user button 223 is also included within the edit user details frame 207 for creating a new user. Activation of the button 223 invokes a prescribed process within the authentication application program as shown at 224. This process causes a dialogue box to be displayed over the administrator edit users screen 205 providing for frames for entering the user ID and password, and an accept button, whereupon activation of which causes the user and password to be displayed in the edit frame 221 as shown at 225. Each new user has an initial default data access profile, which sets up all partition devices as hidden, until such time as the administrator edits the data access profile for the user using the access edit screen. The administrator accesses this screen by activating the corresponding access button as shown at 226 for the user requiring editing in the edit frame 221.

The return to admin login button 211 is provided to allow the administrator to return to the administrator type login screen 191 from the administrator edit users screen 205 as shown at 227.

Figure 7E:
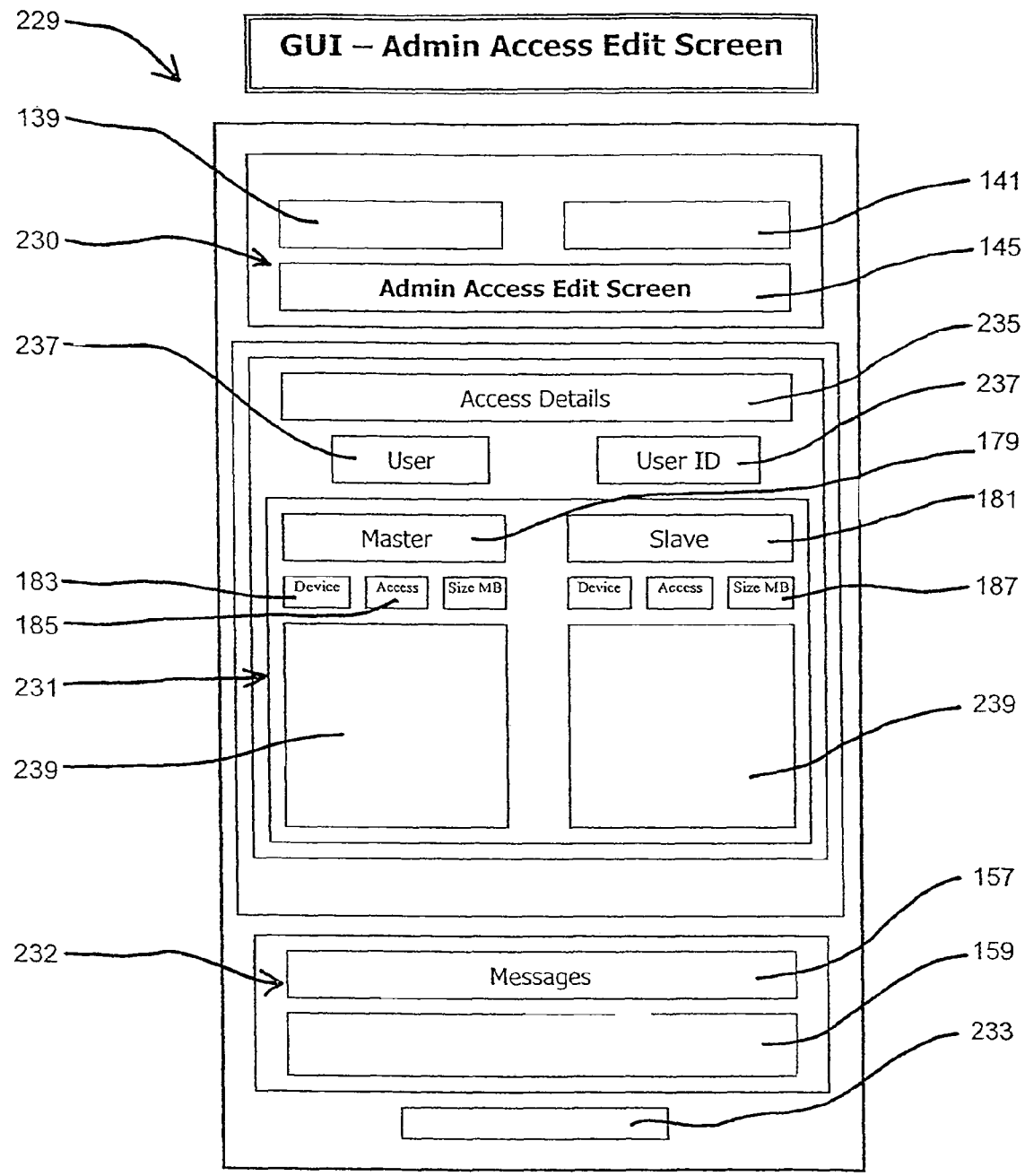
FIG. 7E shows the specification format for the administrator's access edit GUI screen.

Activating the access button beneath the sub-title banner 219 alongside any user listed in the user list of the edit user details frame 207 causes the authentication application program to display at step 228 the administrator access edit screen, the graphical specification of which is shown in FIG. 7E of the drawings. The administrator access edit screen 229 is divided into a heading frame 230 and an edit access details frame 231, a message/log frame 232 and a return to admin user text edit screen button 233.

The heading frame 230 is the same as in preceding screens except that the title banner is provided with appropriate text to identify that the screen is of the administrator access edit type as shown at 235. The message/log frame 232 is the same as in proceeding screens and accordingly the same reference numerals have been used to identify corresponding attributes between the screens.

The edit access details frame 231 comprises a head banner 235 displaying the text "access details", a sub-banner 237 containing the text "user" and a display frame 239 adjacent thereto for displaying the user ID of the particular user selected from the administrator edit user screen 205.

The edit access details frame 229 then provides a similar frame set up to the device frames of the user type login screen 169 and the administrator type login screen 192, whereby banners for the "master" and "slave" storage media protected by the security device 35 provided at 179 and 181 and respective sub-title banners 183, 185 and 187 detailing the "device", "access" and "size (MB)" titles respectively are provided for each device.

Device detail frames 239 are provided below each of these sub-title banners similar to the display frames 189 of the device detail frames 172 and 197 of the user login and administrator login screens respectively. The device detail frames 239, however, are editable, whereas the former two were not. Accordingly, each device details frame lists the device number under the sub-title banner 183, the access type for the user under the sub-title banner 185 and the device size in MB under the size (MB) sub-title banner 187.

The access type for the user is divided into five types:
read only, depicted in red text;
read/write, depicted in green text; and
invisible, depicted in yellow text;
read directory entry, depicted in grey text; and
delete, depicted in blue text.

As in the previous case, the device numbers represent each of the partitions that are created for the particular storage media device. This, together with the size information, is display only, as determined by the information prescribed for the particular partition stored within the flash ROM 41 of the security device, whereas the access type is editable by highlighting and clicking the displayed entry. In this respect, the displayed entries cycle between read only, read/write, invisible, read directory entry and delete through the graphical user interface by clicking an invisible frame around the displayed text.

In this manner, the access type for each partition can be individually set and edited to create a particular data access profile for the selected user. The particular data access profile created for the user is processed by the authentication application program and supplied to the security device 35 on activating the return to admin user edit screen button 233 as shown at 241. At this time, the display data access profile as determined by the administrator is communicated to the security device CPU 35 by the host CPU 13 and stored within the security device flash ROM 41.

Simultaneously, the authentication application program returns to displaying the administrator edit user screen 205 from which the administrator can select and edit the data access profile of other users in the edit list 207.

Now having described the function and the various processes performed by the computer system and the security device in the specific embodiment, it can be seen that the subject invention has several distinguishing and advantageous attributes and features compared with known prior art systems.

In particular it should be appreciated that the security device itself described in the specific embodiment is physically disposed and connected solely to the data access channel between the computer system and the interface logic communicating with the main CPU data and address bus 15 and the storage media 21. Importantly, the security device is not connected directly to the main bus 15, thereby preventing any opportunity of the device to act as an addressable device and be over-ridden by the operation of the host CPU 13.

Furthermore, being confined to communicating along the data access channel to the storage media and the more generic standardization of such access channels compared with main bus structures of computer systems, increases the utility of the security device for use with a large number of different types of computer systems which may have varying bus structures but utilise the same data access channel standard. In this respect, there are only a few common types of data access channel, ATA, SCSI, fibre, USB (Universal Serial Bus) etc, whereas the diversity and complexity of bus structures are far more widespread.

Another attribute of the present embodiment is that the security device intercepts communication with the protected data storage media at the earliest possible stage in the computer start up sequence and is entirely self-contained and connected in as part of the computer system. Other types of data storage protection devices and anti-virus systems are not entirely self-contained, requiring set up by inserting a separate floppy disk, CD ROM, or other way of installing software onto the host computer, which is not accessed until well into the BIOS program after performance of the "device ID", where the storage device is vulnerable to unauthorized access, or even well after the installation of the operating system files. In particular, when compared with software protection systems, which tend to be the main type of anti-virus protection system being promoted at present, the operating system of the computer needs to be loaded before the application program can be run, which provides huge openings for unauthorized access to the storage device as can be seen from the aforementioned description, before any type of protection can be provided by the anti-virus application program.

Another attribute of the described embodiment is the two phase process undertaken during the start up sequence of the computer system, whereby the BIOS is interrupted at the device ID check stage and an authentication process is performed prior to loading of the boot sector from the protected storage device and the operating system thereof. Thus, it is only after valid authentication of the user starting up the machine for the first time has been undertaken that access to the storage device is allowed at which time access is only permitted to the protected storage media in accordance with the pre-determined data access profile of the particular user.

It should be also appreciated that the particular configuration of the security device 35 provides for extendibility, allowing for other types of storage media 47 to be connected thereto via a custom interface 49 and secure media interface 45.

It should be appreciated that the scope of the present invention is not limited to the particular embodiment herein described and that other embodiments of the invention may be envisaged without departing from the scope or spirit of the present invention. For example, the physical location of the security device may not be limited to being interposed intermediately of the cable connecting the storage device or media to the interface logic, whereby the security device may instead repose directly upon the system card adjacent the interface logic prior to the physical cable connector at the computer end, or directly upon the HDD of the storage media adjacent to the disk controller after the physical cable connector at the HDD end.

All publications, patents, and patent documents cited in this application are incorporated by reference herein, as though individually incorporated by reference. In the case of any inconsistencies, the present disclosure, including any definitions therein, will prevail. The invention has been described with reference to various specific and preferred embodiments and techniques. However, it should be understood that many variations and modifications may be made while remaining within the spirit and scope of the invention.

What is claimed is:

1. A security device for a computer having a host central processing unit (CPU), computer memory used by the host CPU to load programs in order to operate the computer including data indicative of a computer operating system, and a storage device for storing data to be used by the computer, the security device being arranged so as to be disposed during use in a data access channel between the host CPU and the storage device, and the security device being arranged such that during use all data passing between the host CPU and the security device passes along the data access channel, the security device comprising:

a processor independent of the host CPU to control access during use to the storage device through said data access channel after loading of an operating system from the storage device;

a device memory separate from the computer memory and not addressable by the host CPU, the device memory storing at least one access control computer program for operating the processor in a prescribed manner to control said access;

an authentication program for authenticating a user of the computer; and the security device being arranged during use to intercept a boot sequence of the computer during operation of a BIOS of the computer by forwarding a custom boot loader to the host CPU instead of a requested boot loader, the custom boot loader being arranged to request the authentication program; and in response to the request for the authentication program, the security device being arranged to forward the authentication program through the data access channel to the host CPU for use by the host CPU during initialization of the computer prior to loading of an operating system of the computer from the storage device; and the security device being arranged such that access by the host CPU to the storage device is blocked and the operating system is not loaded from the storage device until the user is authenticated by the authentication program.

2. The security device as claimed in claim 1, wherein each user of the computer has an associated access profile, each access profile comprising information indicative of the level of access to portions of the storage device permitted by a user, and the processor controlling access to the storage device in accordance with the access profile.

3. The security device as claimed in claim 2, wherein the data access profiles are stored in the device memory.

4. The security device as claimed in claim 1, wherein the authentication program requests a user of the computer to enter login identifier and a password, the login identifier and the password being used to verify whether the user is an authorized user of the computer.

5. The security device as claimed in claim 4, wherein said login identifiers and passwords corresponding to a plurality of authorized users are stored in the device memory, and said authentication program accesses said login identifiers and passwords so as to effect authentication of a user.

6. The security device as claimed in claim 2, wherein the authentication program includes a user editor arranged so as to enable at least one authorized user to create and/or edit user access profiles.

7. The security device as claimed in claim 1, wherein the security device is arranged to block all data access by the host CPU to the storage device before initialization of the security device, and the processor is arranged to control all said data access immediately after said initialization.

8. A method of securing and protecting a storage device of a computer from unauthorized access including protecting data indicative of a computer operating system stored on the storage device, the computer including a host central processing unit (CPU) and computer memory used by the host CPU to load host computer programs in order to operate the computer, the method comprising:

providing a security device arranged to control access through a data access channel to the storage device by the host CPU independently of the host CPU after loading of an operating system from the storage device;

directing all data passing between the host CPU and the security device through the data access channel;

storing access control computer programs in a location separate from the computer memory and not addressable by the host CPU, said access control computer programs effecting said access control;

intercepting a boot sequence of the computer during operation of a BIOS of the computer such that in response to a request for a boot loader by the BIOS of the computer, a custom boot loader is forwarded to the host CPU instead of the requested boot loader, the custom boot loader being arranged to cause the host CPU to request an authentication program;

in response to the request for the authentication program, forwarding an authentication program from the security device to the host CPU through the data access channel during initialization of the computer prior to loading of an operating system of the computer from the storage device, authenticating a user using the authentication program; and blocking all access to the storage device by the host CPU and not loading the operating system from the storage device until the user is correctly authenticated by the authentication program.

9. The method as claimed in claim 8, further comprising associating each user of the computer with an access profile, each access profile comprising information indicative of the level of access to portions of the storage device permitted by a user, and controlling access to the storage device in accordance with the access profile.

10. The method as claimed in claim 9, further comprising storing the data access profiles in a location separate from the computer memory and not addressable by the host CPU.

11. The method as claimed in claim 8, wherein the authenticating step comprises requesting a user of the computer to enter a login identifier and a password, and verifying whether the user is an authorized user of the computer using the login identifier and the password.

12. The method as claimed in claim 11, further comprising storing said login identifiers and passwords corresponding to a plurality of authorized users in a location separate from the computer memory, and not addressable by the host CPU, and wherein the authenticating step comprises accessing said login identifiers and passwords so as to effect authentication of a user.

13. The method as claimed in claim 9, further comprising enabling at least one authorized user to at least one of create and edit user access profiles.

14. A method as claimed in claim 8, further comprising:

blocking all data access by the host CPU to the storage device during initialization of the security device.

15. A security device for a computer having a host central processing unit (CPU), computer memory used by the host CPU to load programs in order to operate the computer, and a storage device to store data to be used by the computer including data indicative of a computer operating system, the security device being arranged so as to be disposed during use in a data access channel between the host CPU and the storage device, and the security device being arranged such that during use all data passing between the host CPU and the security device passes along the data access channel, the security device comprising:

a processor independent of the host CPU to control operation of the security device after loading of an operating system from the storage device;

a device memory separate to the computer memory and not addressable by the host CPU, the device memory separate to the computer memory and not addressable by the host CPU, the device memory storing at least one computer program for use by the processor to control operation of the security device;

an authentication program for authenticating a user of the computer; and the security device being arranged during use to intercept a boot sequence of the computer during operation of a BIOS of the computer by forwarding a custom boot loader to the host CPU instead of a requested boot loader, the custom boot loader being arranged to request the authentication program; and in response to the request for the authentication program, to forward the authentication program through the data access channel to the host CPU for use by the host CPU during initialization of the computer prior to loading of an operating system of the computer from the storage device; and the security device being arranged such that access by the host CPU to the storage device is blocked and the operating system is not loaded from the storage device until the user is authenticated by the authentication program.

16. The security device as claimed in claim 15, wherein each user of the computer has an associated access profile, each access profile comprising information indicative of the level of access to portions of the storage device permitted by a user, and the processor controlling access to the storage device in accordance with the access profile.

17. The security device as claimed in claim 16, wherein the data access profiles are stored in the device memory.

* * * * *